United States Patent [19]

Barlow

[11]  4,410,943

[45]  Oct. 18, 1983

[54] MEMORY DELAY START APPARATUS FOR A QUEUED MEMORY CONTROLLER

[75] Inventor: George J. Barlow, Tewksbury, Mass.

[73] Assignee: Honeywell Information Systems Inc., Waltham, Mass.

[21] Appl. No.: 246,570

[22] Filed: Mar. 23, 1981

[51] Int. Cl.³ .................... G06F 13/06; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,643,227 | 2/1972 | Smith et al. | 364/200 |
| 3,699,530 | 10/1972 | Capowski et al. | 364/200 |
| 4,115,851 | 9/1978 | Nagano et al. | 364/200 |
| 4,121,286 | 10/1978 | Venton et al. | 364/200 |
| 4,214,305 | 7/1980 | Tokita et al. | 364/200 |
| 4,228,500 | 10/1980 | Webster | 364/900 |

Primary Examiner—Mark E. Nusbaum
Assistant Examiner—Jameson Lee
Attorney, Agent, or Firm—Faith F. Driscoll; Nicholas Prasinos

[57] ABSTRACT

A memory controller couples to a bus and controls a number of memory module units or memory modules. The controller includes a number of queue circuits for processing a variety of different types of memory requests received from a number of command generating units coupled to the bus requiring the controller to operate in a corresponding number of different modes. The controller includes queue start timing control apparatus which couples to the modules and to the queue circuits for resolving conflicts between the types of requests and the internal operations required to be performed by the controller within a minimum of time.

29 Claims, 7 Drawing Figures (sheet 1 of 2)

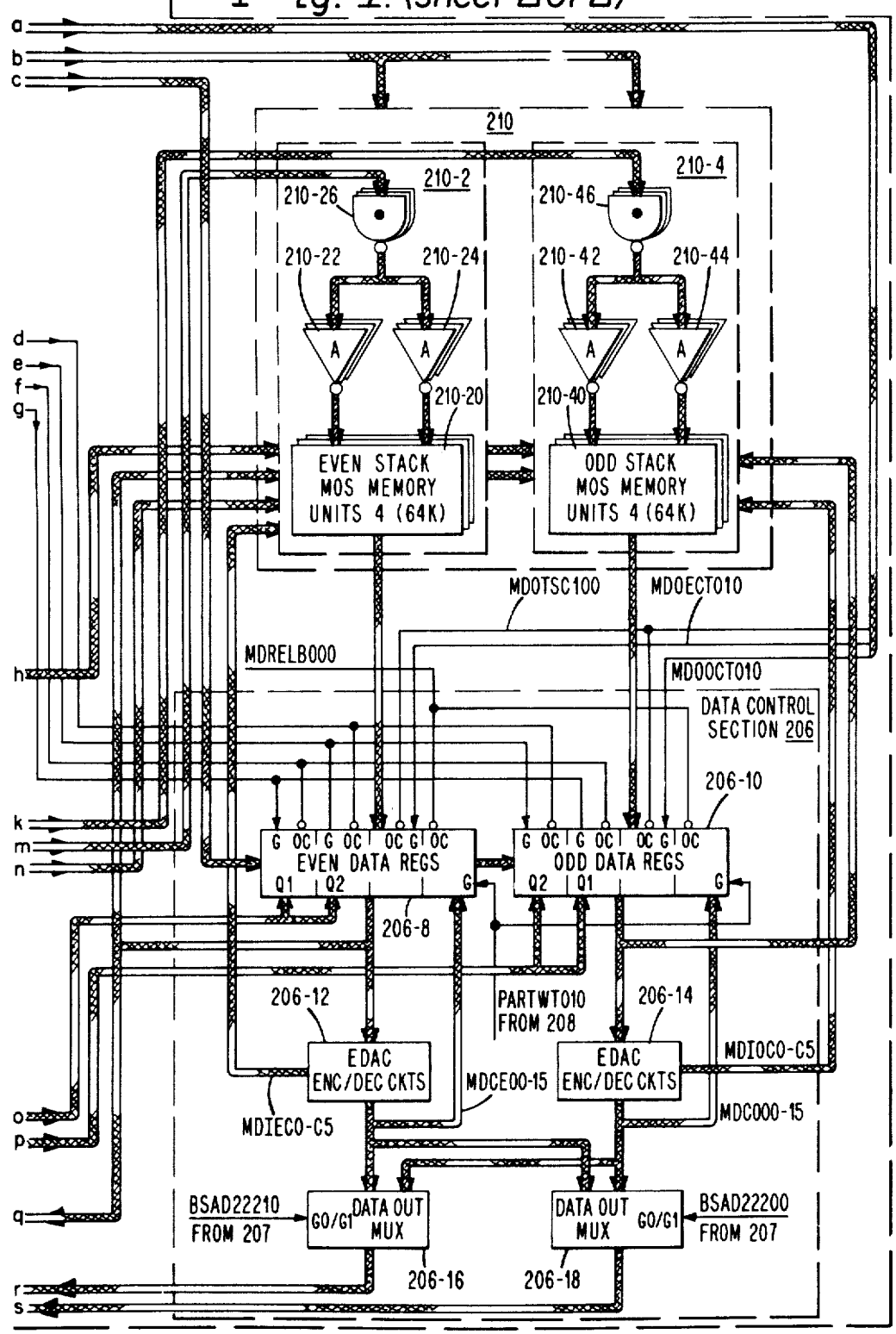
Fig. 1. (sheet 2 of 2)

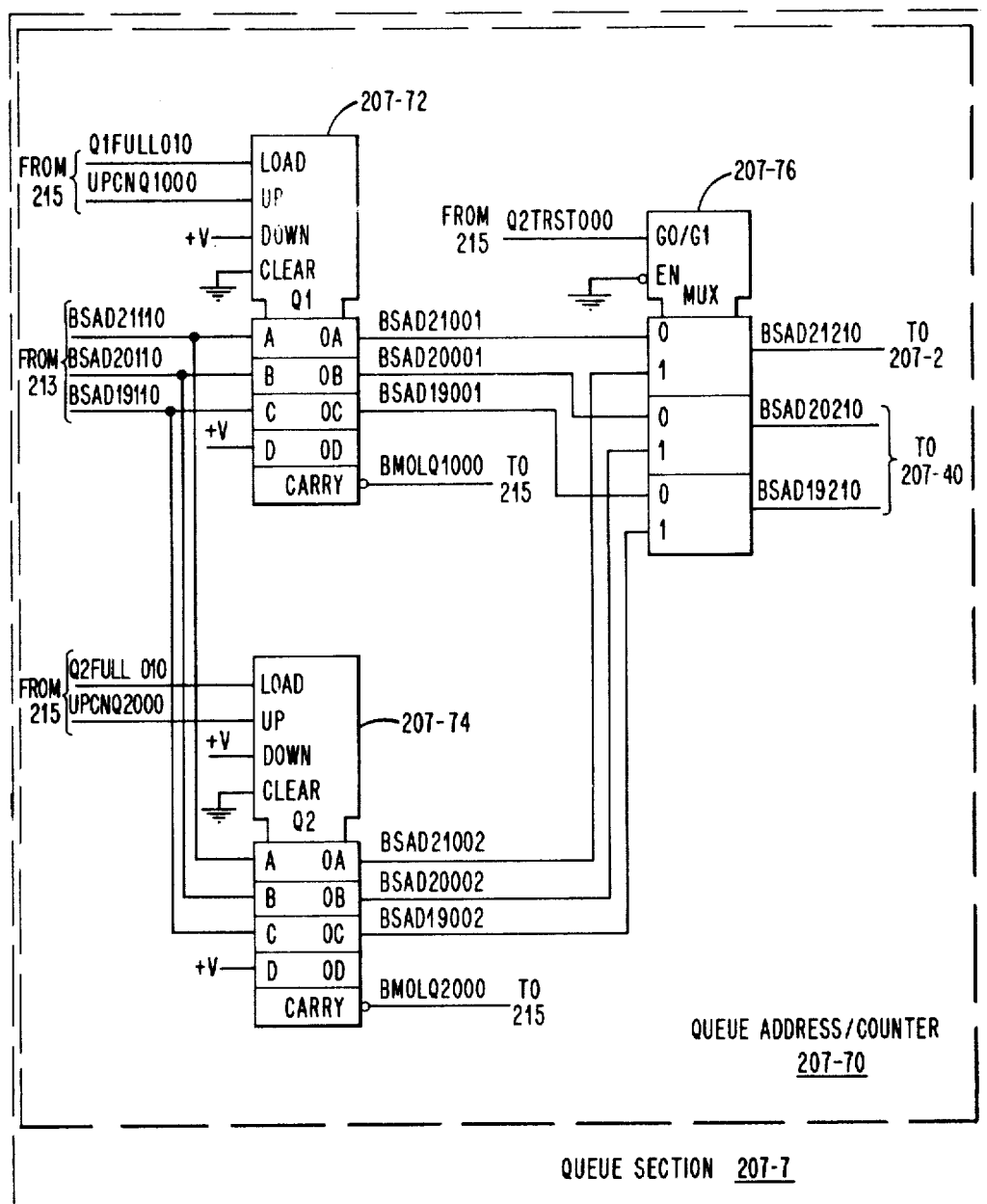
Fig. 2. (sheet 1 of 2)

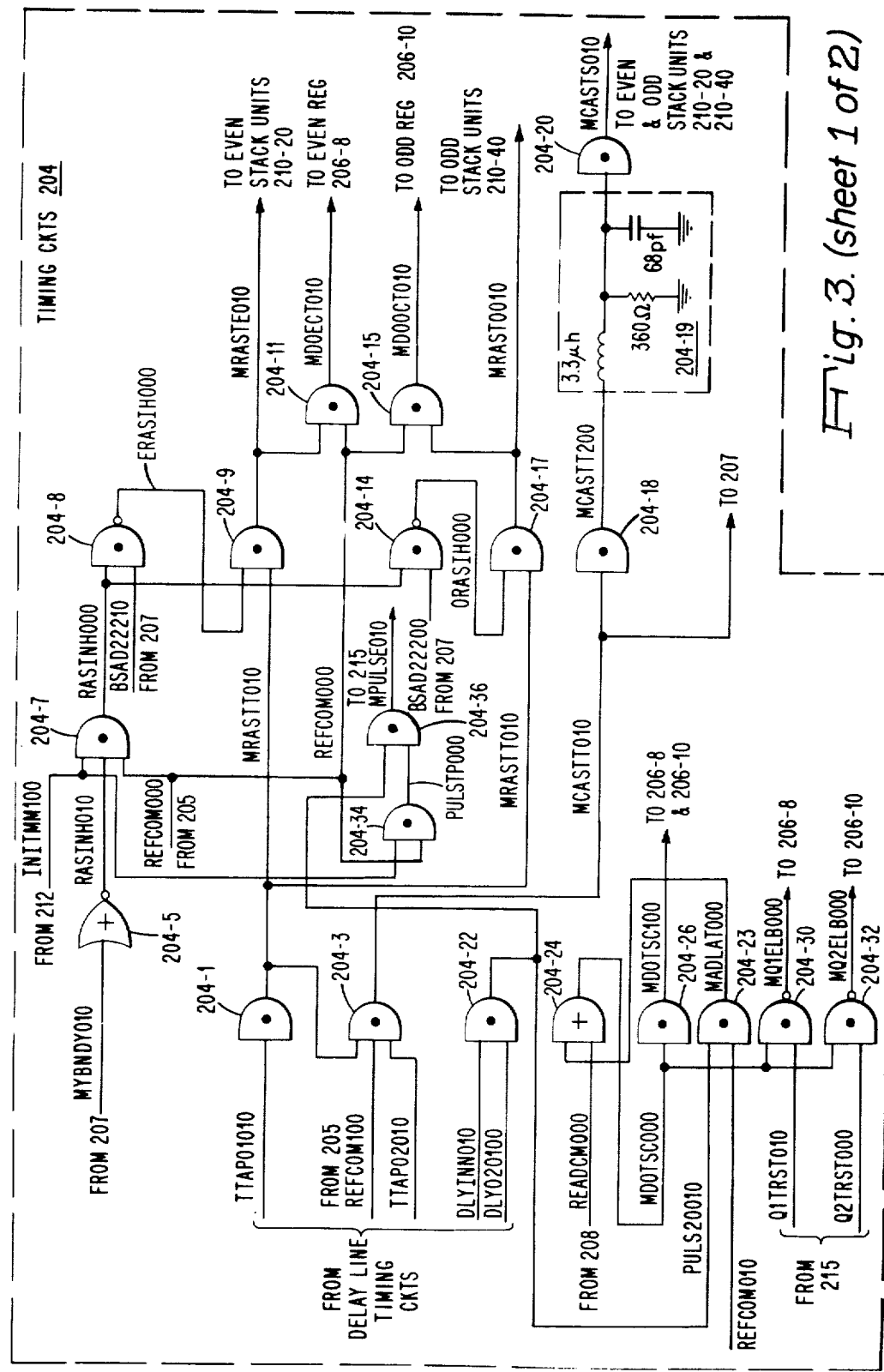
Fig. 3. (sheet 1 of 2)

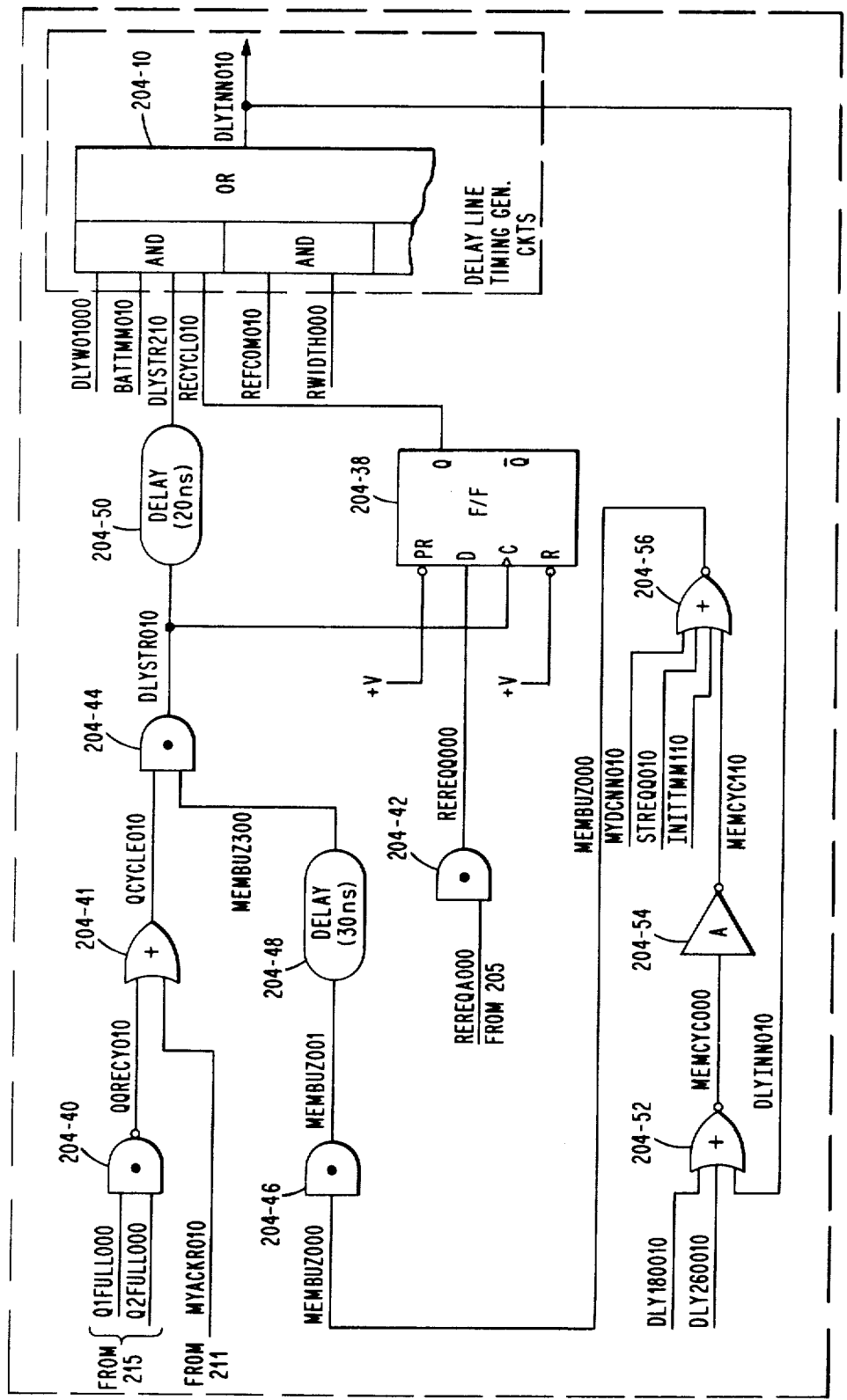
Fig. 3. (sheet 2 of 2)

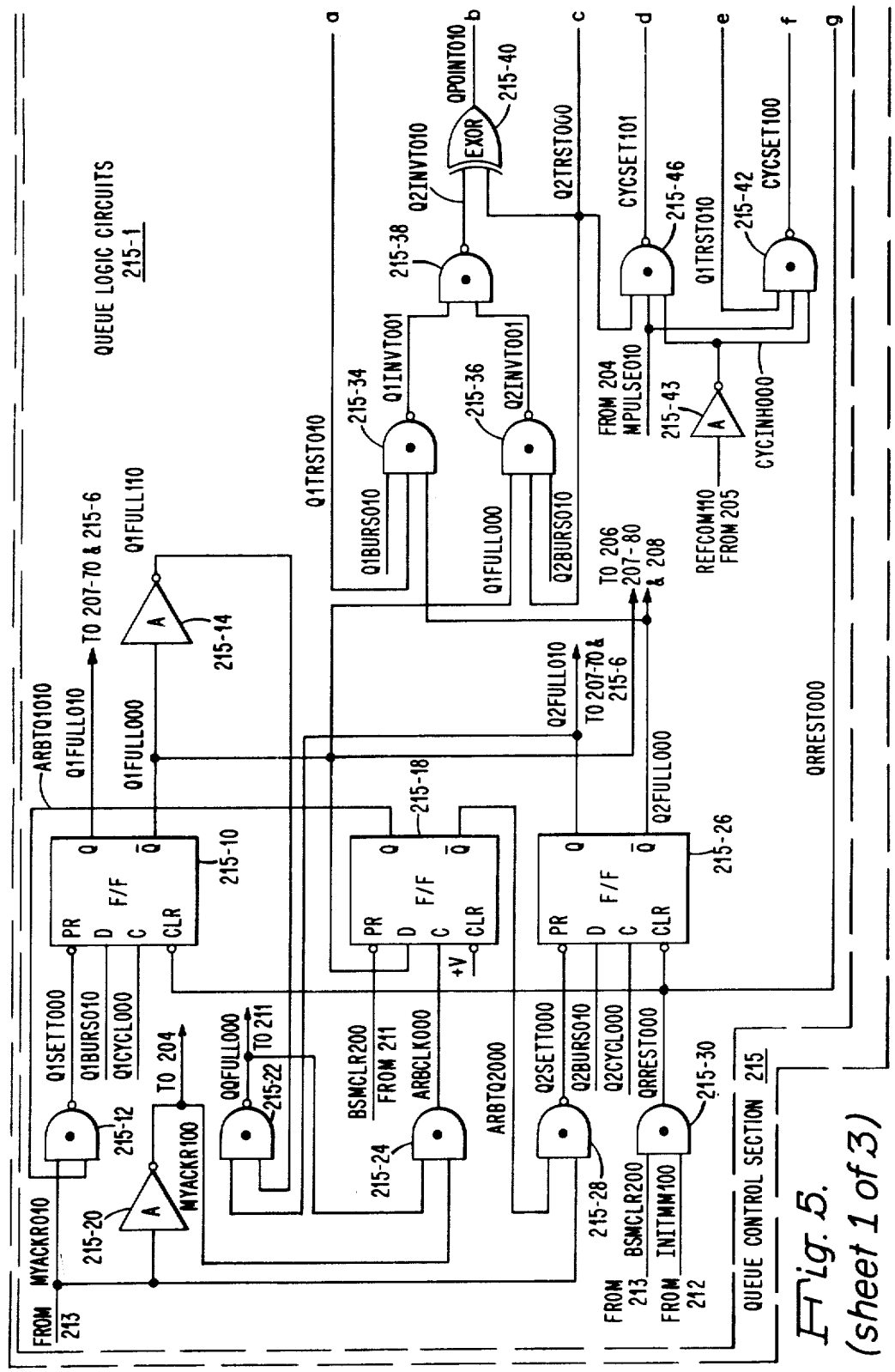
Fig. 5. (sheet 1 of 3)

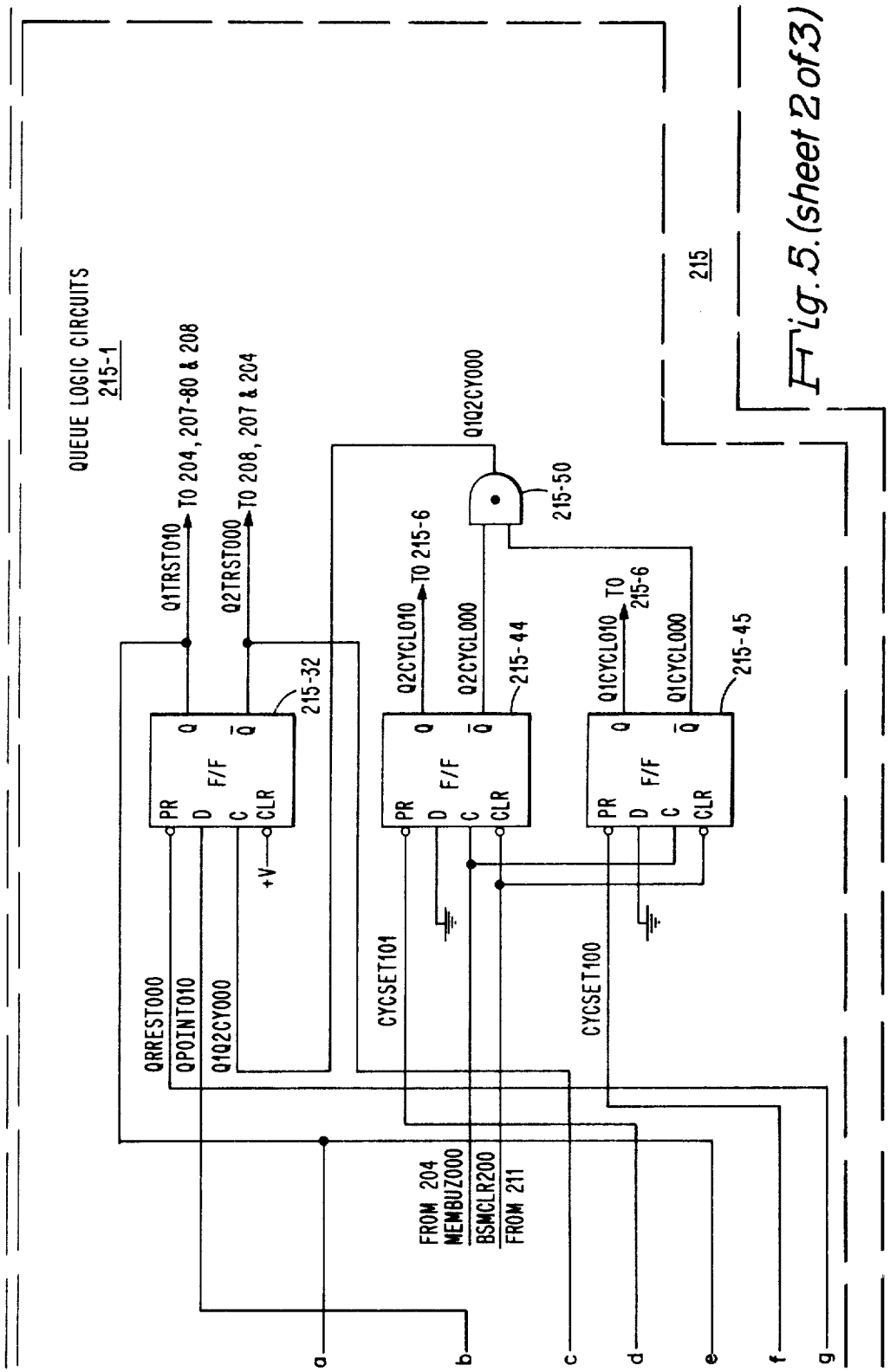

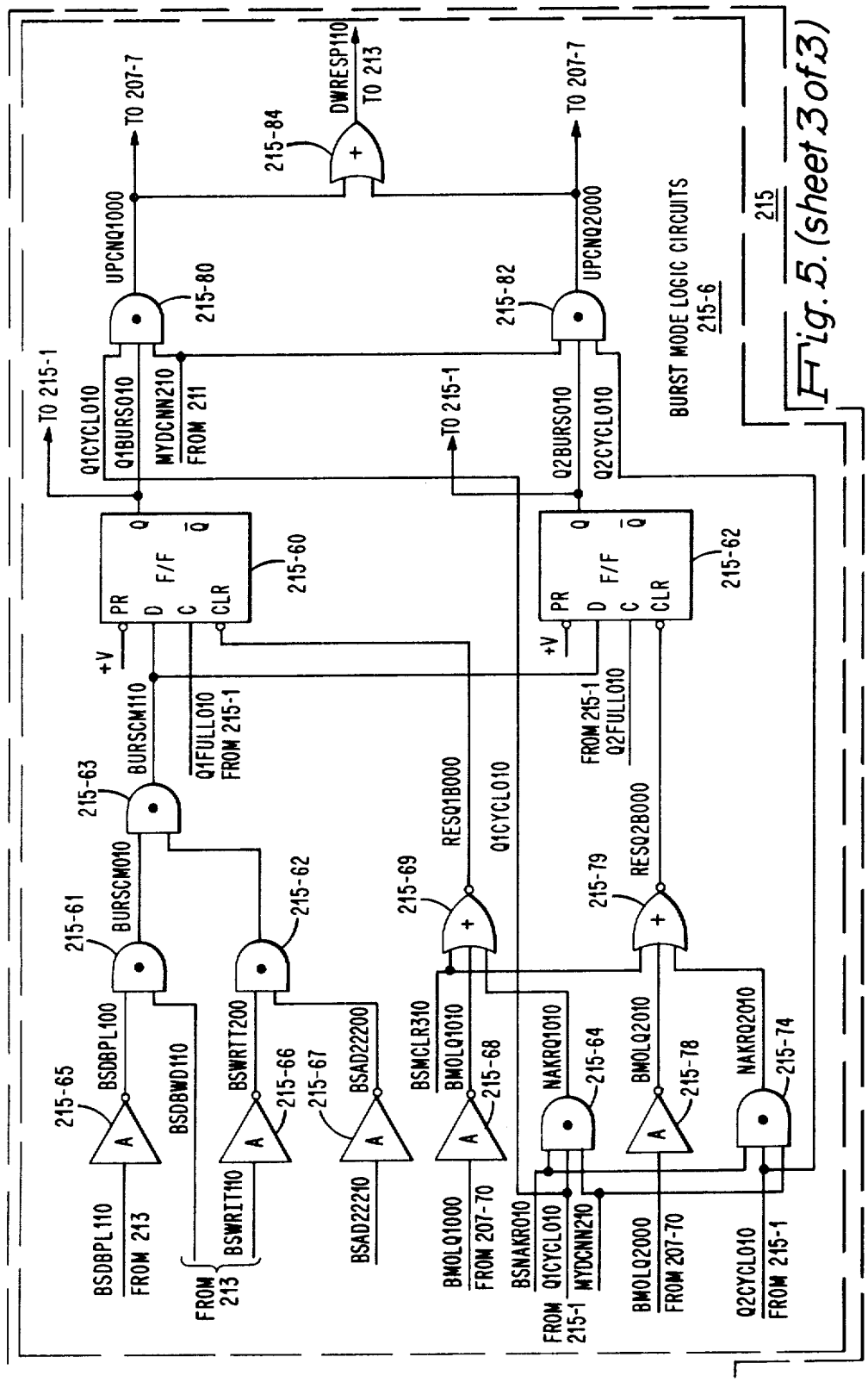
Fig. 5. (sheet 3 of 3)

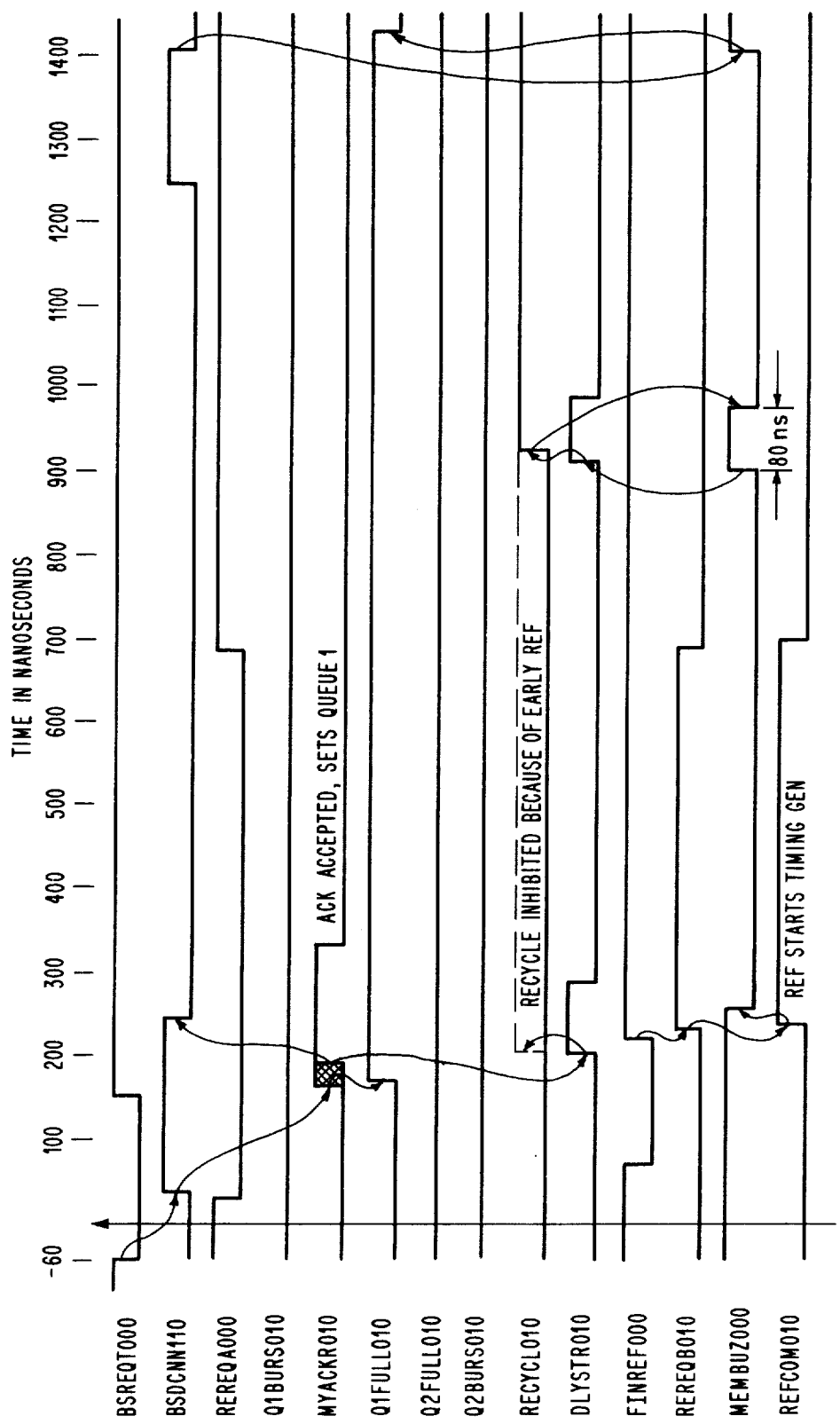
Fig. Z.

MEMORY DELAY START APPARATUS FOR A QUEUED MEMORY CONTROLLER

REFERENCED APPLICATIONS

1. "A Memory Controller with Queue Control Apparatus", invented by Robert B. Johnson and Chester M. Nibby, Jr., Ser. No. 202,560, filed on Oct. 31, 1980 and assigned to the same assignee as named herein.

BACKGROUND OF THE INVENTION

1. Field of Use

This invention relates to memory systems and more particularly to efficiently and reliably process a variety of memory requests in conjunction with performing internal operations involving access to memory.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in U.S. Pat. No. 4,236,203, issued Nov. 25, 1980 entitled "System Providing Multiple Fetch Bus Cycle Operation", invented by John L. Curley, Robert B. Johnson, Richard A. Lemay and Chester M. Nibby, Jr., and assigned to the same assignee as named herein.

In the above prior art system, the memory system connects to an asynchronously operated single word wide bus. In the arrangement, a request for multiple words is made in a single bus cycle and the requested information words are delivered to the bus over a series of response cycles. While this arrangement improves the system throughput capabilities, it becomes desirable to be able to provide a memory system able to respond to a plurality of different types of requests involving the transfer of multiple words over a single bus accessed simultaneously during a series of cycles without incurring communication delays. This becomes desirable where it is desired to provide a high speed transfer of data to another memory device such as a cache unit or disk device.

The copending patent application "A Memory Controller with Interleaved Queuing Apparatus" Ser. No. 202,821, filed Oct. 31, 1980, of Robert B. Johnson and Chester M. Nibby, Jr. discloses apparatus which facilitates the processing of the above mentioned requests. In addition to processing a variety of different types of requests, the controller is required to respond to internal requests requiring access to memory. For example, such requests may involve the processing of refresh commands.

To minimize conflicts, one prior art controller performs refresh cycles of operation in parallel with certain types of memory operations. This controller is disclosed in U.S. Pat. No. 4,185,323 which is assigned to the same assignee as named herein. However, the types of memory operation is one which involves a single fetch access. Hence, in the case of double fetch operations, refresh commands necessitate interrupting the normal processing of memory requests. While this has produced minimum interference in processing memory requests specifying a sufficient number of single fetch accesses, there is increase in interference when the controller is required to process memory commands involving transfers of multiple groups of data words.

The copending patent application of Robert B. Johnson and Chester M. Nibby, Jr. entitled "A Memory Controller with Queue Control Apparatus" includes queue control circuits and cycle control circuits. The cycle control circuits operate to initiate memory cycles of operation when the queue control registers store memory requests which are being processed by the queue circuits and resolve conflicts between such requests and internally generated requests. Generally, the internal requests involve refresh operations performed in response to refresh command signals periodically generated for interrupting controller operations to perform a cycle of operation required for refreshing rows of memory elements within the controller's memory module units.

Such requests also include other types of requests requiring allocations of memory cycles, such as soft error rewrite cycle operations described in U.S. Pat. No. 4,359,771, issued Nov. 16, 1982, entitled "A Method and Apparatus for Testing and Verifying the Operation of Error Control Apparatus Included Within a Memory System" invented by Robert B. Johnson, et al.

While the above described cycle control apparatus resolved conflict situations, it was found that it could not ensure complete unambiguous resolution of such conflicts when modified to operate at increased performance levels. Also, in certain instances, the processing of queue requests were delayed so as to decrease memory efficiency.

Accordingly, it is a primary object of the present invention to provide improved memory cycle apparatus which permits a memory controller to efficiently process at high performance rates a variety of different types of memory requests which specify a multiword data transfer to a device.

It is a further object of the present invention to provide improved memory cycle apparatus for eliminating conflicts within a minimum of time between a variety of different types of memory requests and internal requests requiring consecutive memory cycles of operation thereby improving memory performance.

SUMMARY OF THE INVENTION

The above objects are achieved in a preferred embodiment of the memory controller of the present invention. The memory controller couples to a bus in common with a number of command generating units (e.g. data processing unit controller, disk controller, etc.) for processing different types of memory requests received from the units. The controller is coupled to control the operation of a number of memory module units or memory modules in response to the different types of memory requests.

The controller includes a plurality of queue circuits. Each of the queue circuits includes an address queue register, a control queue register and at least one data queue register.

In accordance with the teachings of the present invention, the controller further includes queue control circuits and cycle control circuits. The queue control circuits couple to the address, control and data registers of each of the queue circuits. The cycle control circuits assign memory cycles of operation when the queue control registers store memory requests to be processed by the queue control circuits. Memory delay start circuits are connected to control the operation of timing generator circuits which generate the necessary sequences of timing signals for carrying out a memory cycle of operation. At the end of each memory cycle of operation after a predetermined minimum time period, the memory delay start circuits determined whether or not another memory cycle of operation is to be initiated.

In the preferred embodiment, in accordance with the invention teachings, the memory start circuits include input logic gating circuits for combining signals indicative of pending queue requests and bus requests and logic circuits for generating a start signal by combining the signals received from the input logic gating circuits and a signal indicative of the end of a current memory cycle, a predetermined minimum period after the completion of the current memory cycle. The start signal is applied as a clock input to a bistable recycle device whose data input is connected to receive signals indicative of generated internal requests. An output from the bistable recycle device is logically combined with the start signal so as to initiate a memory cycle within the timing generator circuits following the resolution of conflicting requests within a minimum of time. When an internal request is pending or is about to be generated, the bistable recycle device switches to a state which inhibits a memory cycle of operation from being initiated.

A minimum amount of time following the completion of the memory cycle during which the internal request is processed, the bistable recycle device switches state enabling another memory cycle to be initiated for processing the pending queue or arriving bus requests.

The arrangement of the memory delay start circuits permits ambiguous resolution of conflicting requests by establishing a minimum start interval after which a pending queue or bus request can be initiated. When an internal request is in the process of being generated, the memory start circuits interrupt the recycling until it can be reinitiated after the conflict is over. By simplifying the amount of circuits for resolving request conflicts, the reliability of the memory is increased and is also rendered unsusceptible to transient and noise conditions.

More importantly, the arrangement of the present invention provides for the efficient processing of pending queue requests concurrently with handling of internal requests. This is accomplished by providing a fast path for processing such queue requests thereby increasing memory performance.

Thus, the present invention provides reliable assignment of memory cycles between the queue circuits and internal operations on a preestablished priority basis. The minimum delay between successive memory cycles improves controller performance as well as facilitating the processing of the different types of memory requests.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limit of the present invention.

BRIEF DESCRIPTION OF THE DRAWINGS

FIGS. 2 through 6 illustrate in greater detail the different portions of the memory subsystem 20 of FIG. 3.

FIG. 7 is a timing diagram used describing the operation of the apparatus of the present invention.

GENERAL DESCRIPTION OF THE SYSTEM OF FIG. 1

Figure 1:
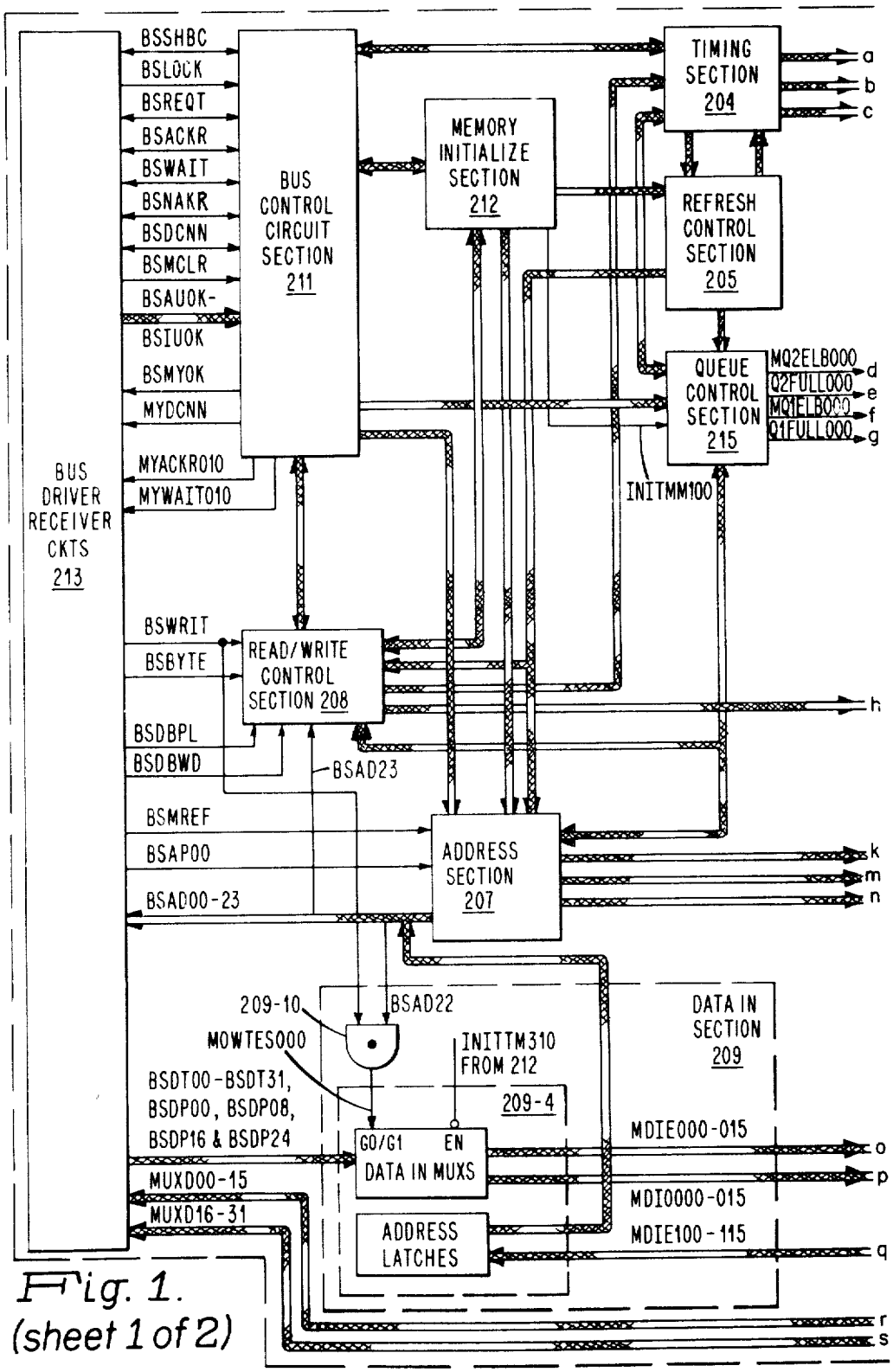
FIG. 1 shows in block diagram form a memory subsystem which incorporates the apparatus of the present invention.

FIG. 1 shows a preferred embodiment of memory subsystem 20 including controller 200 which is constructed using the principles of the present invention. Referring to FIG. 1, it is seen that the controller 200 controls the two 256K word memory module units 210-2 and 210-4 of memory section 210. The module units of blocks 210-2 and 210-4 include high speed MOS random access memory integrated circuits corresponding to blocks 210-20 and 210-40, and address buffer circuits corresponding to blocks 210-22 through 210-26 and 210-42 through 210-46. Each 256K memory unit is constructed from 64K word by 1-bit dynamic MOS RAM chips. More specifically, each 256K by 22-bit memory module includes 88, 65,534 (64K) word by 1-bit chips. Within each chip there a number of storage arrays organized in a matrix of 256 rows by 256 columns of storage cells.

The controller 200 includes those circuits required to generate memory timing signals, perform refresh operations, rewrite control operations, data transfer operations, address distribution and decoding operations and bus interface operations. Such circuits are included as part of the different sections of FIG. 1.

The sections include a timing section 204, a refresh control section 205, a queue control section 215, a data control section 206, an address section 207, a read/write control section 208, a data-in section 209, a bus control circuit section 211, a memory initialize circuit section 212, and bus driver/receiver circuit section 213.

The bus control section 211 includes the logic circuits which generate signals for generating and accepting bus cycle requests for single and double word operations. These circuits as well as the circuits of the other sections are connected to a bus via the driver/receiver circuits of section 213 which were conventional in design. The section 211 includes the tie breaking network circuits which resolve requests priority on the basis of a unit's physical position on the bus. The memory controller, located at the left most or bottom position of the bus, is assigned the highest priority while a central processing unit (CPU), located at the right most or top position of the bus is assigned the lowest priority. For further information regarding bus operation, reference may be made to U.S. Pat. No. 4,000,485 which issued Dec. 28, 1976.

The timing section 204, shown in detail in FIG. 3, includes circuits which generate the required sequence of timing signals from memory read and write cycles of operation. As seen from FIG. 1, this section transmits and receives signals to and from sections 205, 206, 207, 208, 211 and 215.

The address section 207, shown in greater detail in FIG. 3, includes circuits which decode, generate and distribute address signals required for refresh operations, initialization and read/write selection. The section 207 receives address signals from lines BSAD08-B-

SAD23 and address lines BSAD00-BSAD07 and BSAP00 in addition to the memory reference control signal from the BSMREF line. Additionally, section 207 receives control and timing signals from sections 204, 212 and 205.

The memory initialization section 212 includes circuits, conventional in design, for clearing the memory controller circuits to an initial or predetermined state.

The read/write control section 208 includes register and control logic circuits, conventional in design. The register circuits receive and store signals corresponding to the states of the BSWRIT, BSBYTE, BSDBPL, BSDBWD and BSAD23 lines in addition to boundary signal BOUNDY110 from section 207. The control circuits decode the signals from the register circuits and generate signals which are applied to sections 204, 207 and 210 for establishing whether the controller is to perform the read, write or read followed by a write cycle of operation (i.e., for a byte command).

The refresh section 205 includes the circuits for periodically refreshing the contents of the memory. Section 205 receives timing and control signals from section 204 and provides refresh command control signals to sections 204, 207, 208 and 212. For further details, reference may be made to U.S. Pat. No. 4,185,323 which discloses circuits for generating refresh command (REFCOM) signals.

The data in section 209 circuits of block 209-4 include a pair of multiplexer circuits and an address register which is connected to receive signals from section 206. The multiplexer circuits, conventional in design, receive data words from the two sets of bus lines BSDT00-15 and BSDT16-31 and apply the appropriate words via the sets of output lines MDIE000-015 and MDIO000-015 to correct memory modules during a write cycle of operation. That is, multiplexer circuits are selectively enabled by signal MOWTES000 generated by an AND gate 209-10 when initialize signal INITTM310 from 212 is a binary ZERO (i.e., not in an initialize mode). The AND gate 209-10 generates signal MOWTES000 as a function of bus address bit 22 (i.e., signal BSAD222) and whether the memory subsystem is doing a write operation (i.e., signal BSWRIT). During a write operation, signal MOWTES000 selects the correct data word (i.e., the word applied to bus lines BSDT00-15 or BSDT16-31) to be applied to the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

The data control section 206 includes two tristate operated data registers 206-8 and 206-10 and multiplexer circuits 206-16 and 206-18 with associated control circuits which enable data to be written into and/or read from the even and odd memory units 210-20 and 210-40 of section 210. For example, during a double wide read cycle operation, operand or instruction signals are read out from the units 210-20 and 210-40 into the even and odd output registers 206-8 and 206-10.

During a write cycle of operation, the byte operand signals are loaded into the leftmost section of the pair of registers 206-8 and 206-10 from the bus via section 209-4 and written into the odd or even unit of section 210.

The controller 200 includes error detection and correction (EDAC) apparatus wherein each word contains 16 data bits and 6 check bits used to detect and correct single bit errors in the data words and detect and signal without correction, double bit errors in the data word. The EDAC apparatus includes two sets of EDAC encoder/decoder circuits 206-12 and 206-14. These circuits may take the form of those circuits disclosed in U.S. Pat. No. 4,072,853 which issued Feb. 7, 1978. Additionally, the section 206 enables a return of identification information received from the data lines BSDT00-15 and stored in register 209-4 via the address lines BSAD08-23.

The queue control section 215 includes circuits for storing address and control information for concurrently processing a plurality of memory requests. As seen from FIG. 1, section 215 receives control signals from sections 204, 205, 207, 211 and 212. The section provides control signals to sections 206, 207 and 208 as shown.

Pertinent portions of the above sections will now be discussed in greater detail with reference to FIGS. 2 through 6.

DETAILED DESCRIPTION OF CONTROLLER SECTIONS

Only those sections which are believed necessary to an understanding of the present invention are described herein. For further information regarding the remaining sections, reference may be made to the related patent applications or to U.S. Pat. No. 4,185,323.

Section 204 and Section 206

FIG. 3 illustrates in greater detail, the timing circuits of section 204 in accordance with the principles of the present invention. The circuits receive input timing pulse signals TTAP01010, TTAP02010, DLYINN010 and DLY020100 from delay line timing generator circuits, not shown, conventional in design. Such circuits may take the form of the timing generator circuits shown in U.S. Pat. No. 4,185,323, a portion of which is shown in FIG. 3. The timing generator circuits generate a series of timing pulses via a pair of series connected 200 nanosecond delay lines in response to a delay line start signal DLYSTR210 or a refresh command signal REFCOM010. These pulses in conjunction with the circuits of block 204 establish the timing for the remaining sections during a memory cycle of operation.

Additionally, the circuits of block 204 receive a boundary signal MYBNDY010 and address signals BSAD22200 and BSAD22210 from section 207. Also, section 212 applies an initialize signal INITMM100 to section 204. The signal MYBNDY010 is applied to a NOR gate 204-5 which forces signal RASINH010 to a binary ZERO when forced to a binary ONE. The series connected AND gate 204-7 logically combines initialize signal INITMM100, refresh command signal REFCOM000 generated by circuits within section 204, not shown, and signal RASINH10 to produce signal RASINH000. A NAND gate 204-8 combines signals RASINH000 and address signal BSAD22210 to produce an even row strobe inhibit signal ERASIH000. The signal is applied to an AND gate 204-10 for combining with a timing signal MRASTT010 derived from signal TTAP01010 via an AND gate 204-1. The result output signal MRASTE010 is applied to the RAS timing input of the even stack units 210-20.

A NAND gate 204-14 combines signals RASINH010 and BSAD22200 to produce an odd row inhibit signal ORASIH000. This signal is combined in an AND gate 204-17 with timing signal MRASTT010 to generate row timing signal MRAST0010. This signal is applied to the RAS timing input of the odd stack units 210-40.

As seen from FIG. 3, an AND gate 204-11 applies a timing signal MDOECT010 to a G input terminal of the right middle section of even data register 206-8 in the absence of a refresh command (i.e., signal REFCOM000=1). Similarly, an AND gate 204-15 applies a timing signal MDOOCT010 to a G input terminal of the right middle section of odd data register 206-10. The delay network 204-19 which connects in series with AND gates 204-3, 204-18 and 204-20 generates timing signal MCASTS010. The signal MCASTS010 is applied to the CAS timing input of the even and odd stack units 210-20 and 210-40.

The even and odd data registers 206-8 and 206-10 are tristate operated. More specifically, the registers are constructed from D-type transparent latch circuits such as those designated SN74S373 manufactured by Texas Instruments Incorporated. The register circuits are transparent meaning that while the signal applied to the G input terminal is a binary ONE, the signals at the Q output terminals follow the signals applied to the D input terminals. That is, where the signal applied to the G input terminal goes low, the signal at the Q output terminal latches.

The output terminals of registers 206-8 and 206-10 are connected in common in a wired OR arrangement for enabling the multiplexing of the pair of data word signals. Such multiplexing is accomplished by controlling the states of the signals MQ2ELB000, MQ1ELB000, MDOTSC000, and MDRELB000 applied to the output control (OC) input terminals of the different sections of registers 206-8 and 206-10 shown in FIG. 1. This operation is independent of the latching action of the register flip-flops which takes place in response to the signals applied to the G input terminals.

The series connected group of gates 204-22 through 204-26 control the state of signal MDOTSC100. The AND gate 204-22 receives timing signals DLYINN010 and DLY020100 at the beginning of a read or write cycle for enabling the storage of identification information from the bus. The section 204 further includes a pair of series connected AND gates 204-34 and 204-36 which generate signal MPULSE010 in response to timing signal PULS20210 in the absence of a refresh command (i.e., signal REFCOM000 is a binary ONE) or when the controller 200 is not being initialized (i.e., signal INITMM100 is a binary ONE). during a read operation, read command signal READCM000 is forced to a binary ZERO which causes AND gate 204-26 to force signal MDOTSC100 to a binary ZERO.

The signal MDOTSC100, when a binary ZERO, enables the right middle sections of registers 206-8 and 206-10 to apply their contents of their output terminals. During a write cycle, when read command signal READCM000 is forced to a binary ONE, AND gate 204-26 forces signal MDOTSC100 to a binary ONE. This produces the opposite result to that described. That is, signal MDOTSC100 inhibits the right middle sections of registers 206-8 and 206-10 from applying their contents to their output terminals.

The left most sections of registers 206-8 and 206-10 are enabled to apply their contents to their output terminals when signal MDRELB000 is a binary ZERO. Signal MDRELB000 for the purposes of the present invention can be considered to be in a binary ONE state. Thus, the right most sections of the registers are inhibited from applying their contents to their output terminals.

The left two most sections of registers 206-8 and 206-10 are controlled by the states of signals MQ1ELB000 and MQ2ELB000 which are generated by a pair of NAND gates 204-30 and 204-32. Signal MDOTSC000 when a binary ZERO enables one of the two left most sections of either register 206-8 or 206-10 as a function of the states of signals Q1TRST010 and Q2TRST000 from section 215. When signal Q1TRST010 is a binary ONE, signal Q2TRST000 is a binary ZERO and NAND gate 204-30 forces signal MQ1ELB000 to a binary ZERO. This enables the Q1 section of registers 206-8 and 206-10 to apply their contents to their output terminals. Conversely when signal Q1TRST010 is a binary ZERO, signal Q2TRST000 is a binary ONE and NAND gate 204-32 forces signal MQ1ELB000 to a binary ZERO. This enables the Q2 sections of registers 206-8 and 206-10 to apply its contents to its output terminals.

Lastly, the section 204 further includes the delay start circuit of the present invention. These circuits include a D-type flip-flop 204-38, a NAND gate 204-40, a number of AND gates 204-42 through 204-46, a 30 nanosecond delay circuit 204-48, and a 20 nanosecond delay circuit 204-50 which connect as shown. The circuits generate as an output, delay line start signal DLYSTR010 and recycle signal RECYCL010 which are applied to the input AND/OR gate 204-10 of the timing generator delay line circuits.

When either one or both of the queues are full, NAND gate 204-40 forces queue recycle signal QQRECY010 to a binary ONE. This results in OR gate 204-41 forcing queue cycle signal QCYCLE010 to a binary ONE. OR gate 204-41 also forces signal QCYCLE010 to a binary ONE when bus memory acknowledge signal MYACKR010 is forced to a binary ONE. When memory busy signal MEMBUZ300 is a binary ONE, AND gate 204-44 forces delay start signal DLYSTR010 to a binary ONE.

As seen from FIG. 3, the signal DLYSTR010 after being delayed by 20 nanoseconds is applied as one input to the timing generator circuits while simutaneously being applied to the clock input terminal of the recycle flip-flop 204-38. When the refresh signal REREQQ000 applied to the D input terminal of the flip-flop 204-38 is a binary ONE, signal DLYSTR010 switches the flip-flop to a binary ONE. The binary ONE recycle signal RECYCL010 at the binary ONE output terminal is applied as a second input to the timing generator circuits.

When signal REREQQ000 is forced to a binary ZERO by AND gate 204-42, signal DLYSTR010 switches the recycle flip-flop 204-38 to a binary ZERO state. This results in a binary ZERO recycle signal RECYCL010 being applied to the timing generator circuits. The states of both signals DLYSTR210 and RECYCL010 are logically combined so as to establish the conditions under which a memory cycle of operation can be initiated as explained herein.

The 20 nanoseconds delay 204-50 ensures that the binary ONE output signal RECYCL010 is valid. That is, since both the signals DLYSTR010 and REREQQ000 represent asynchronous events, they could change state in such a way as to cause the flip-flop 204-38 to enter a metastable state for a short interval of time. The 30 nanosecond delay 204-48 establishes the minimum amount of time between a current memory cycle and the next memory cycle as explained herein.

Block 204 of FIG. 3 also includes circuits for generating memory bus signal MEMBUZ000. These circuits include a pair of NOR gates 204-52 and 204-56 and inverter circuit 204-54 connected as shown. The signal MEMBUZ000 is generated as a function of signal MEMCYC110 which is derived from the timing signals from the delay line timing circuits in addition to signals MYDCNN010, STREQQ10 and INITMM110. When any of these signals is forced to a binary ONE, MEMBUZ000 is forced to a binary ZERO indicating that controller 200 is busy performing a memory read (MYDCNN010=1), is busy obtaining a bus cycle (STREQQ010=1) or is busy initializing its contents (INITMM110=1). AT the end of a memory cycle which coincides with the switching of signal MYDCNN010 to a binary ZERO, NOR gate 204-56 switches signal MEMBUZ000 to a binary ONE.

Section 207

Figure 2:
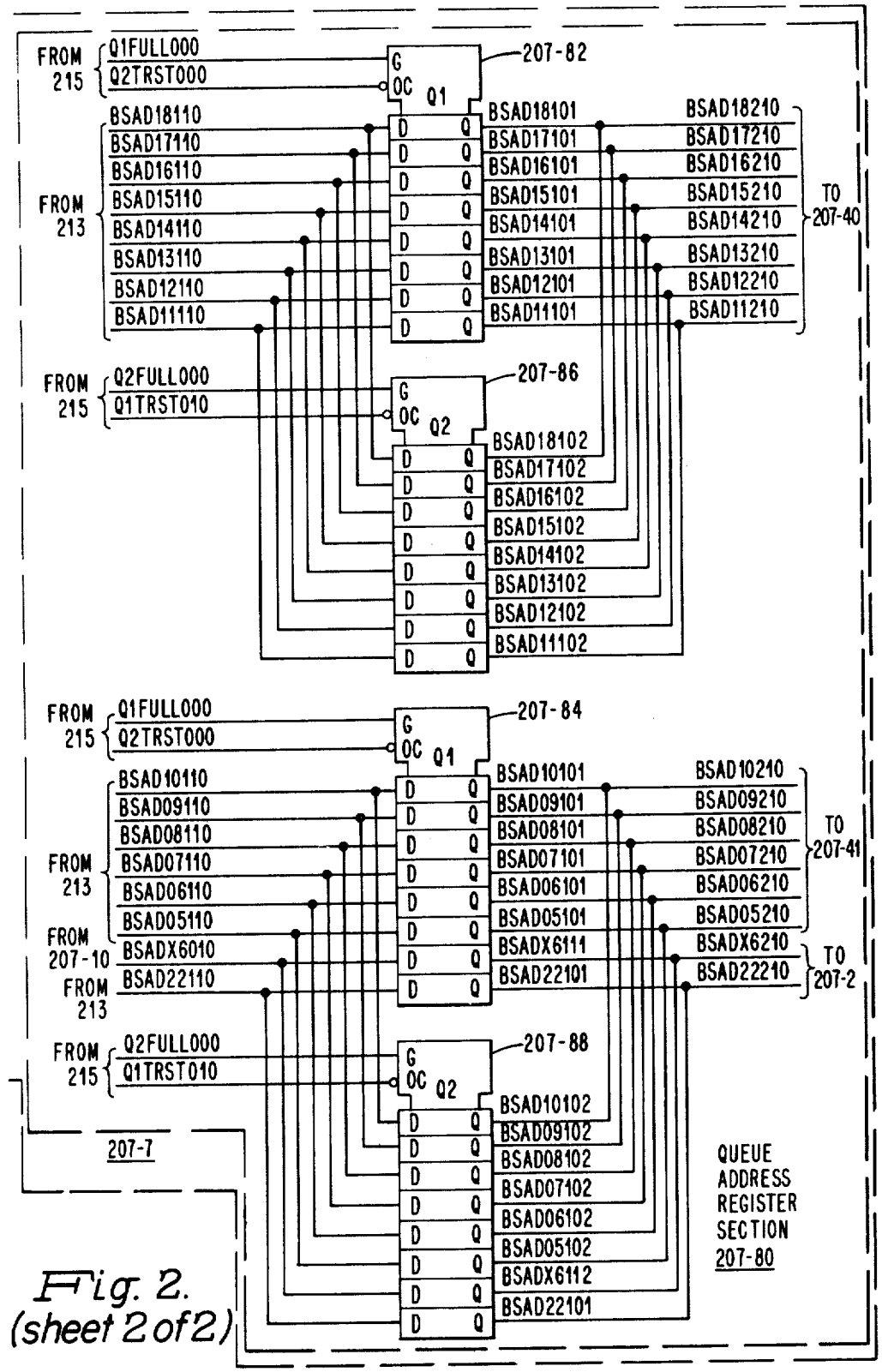

FIG. 2 illustrates in greater detail, the queue section 207-7. For further information regarding the other sections of section 207, reference may be made to the copending patent application of Robert B. Johnson and Chester M. Nibby, Jr. discussed in the introductory portion of this application.

Queue Section 207-7

As seen from FIG. 2, the section 207-7 includes a queue address/counter section 207-70 and queue address register section 207-80. The section 207-70 includes a pair of 4-bit binary counters 207-72 and 207-74 whose outputs connect to a two input multiplexer circuit 207-76. The counters are constructed from conventional chips such as 74193 manufactured by Texas Instruments Corporation while the multiplexer is constructed from a 74S157 chip. As shown, each of the counter circuits 207-72 and 207-74 are connected to receive a portion of memory address bits (i.e., BSAD19, BSAD20 aND BSAD21) of a memory command address of a memory read request which define the starting pair of locations of the first word pair to be transferred to the requesting unit by memory controller 200. Each of the counters 207-72 and 207-74 are loaded with new address information in response to a signal from queue control section 215 indicating that the queue address section associated therewith is not full (i.e., a counter is loaded when either signal Q1FULL010 or Q2FULL010 is a binary ZERO).

When controller 200 is conditioned to operate in a burst mode, each counter is incremented by one in response to a signal (i.e., signal UPCNQ1000 or UPCNQ2000) from section 215 upon completion of the transfer of a word pair to bus 10 from the left most sections of data registers 206-8 and 206-10.

When one of the counters 207-72 or 207-74 has been incremented to a maximum count of 8 indicative of completion of burst command, execution by the memory controller 200, the counter forces a carry output signal (signal BMOLQ1000 or BMOLQ2000) to a binary ZERO which is used to reset a burst command mode flip-flop of section 215 to a binary ZERO.

The outputs of the counters 207-72 and 207-74 are applied to different input terminals of multiplexer circuit 207-76. The circuit 207-76 in accordance with the state of signal Q2TRST000 applies the appropriate set of address signals to section 207-40. More specifically, when signal Q2TRST000 is a binary ZERO, the multiplexer 207-76 selects as an address source, the queue counter 207-72. When signal Q2TRST000 is a binary ONE, the multiplexer selects queue counter 207-74 as the address source.

The queue address register section 207-80 as shown in FIG. 2 receives the bus address signals BSAD05110 through BSAD18110, BSAD6X010 and BSAD22110 are applied via the receiver circuits of block 213 of FIG. 1 as inputs to different stages of queue 1 address registers 207-82 and 207-84 and queue 2 address registers 207-86 and 207-88. Additionally, queue 1 address register 207-84 and queue 2 addres register 207-88 receive signal BSADX6010 from section 207-1. The enabling gate input terminals of registers 207-82 and 207-84 are connected to receive queue 1 signal Q1FULL000 from section 215. The enabling gate input terminals of registers 207-86 and 207-88 are connected to receive queue 2 signal Q2FULL000 from section 215. The OC input terminals of registers 207-82 and 207-84 are connected to receive signal Q2TRST000 while the OC input terminals of registers 207-86 and 207-88 are connected to receive signal Q1TRST010.

Each of the registers 207-82 through 207-88 are constructed from D-type transparent latch circuits such as those designated as SN74S373 previously discussed. As seen from FIG. 4, the different address output terminals of the registers 207-82 and 207-86 and 207-84 and 207-88 are connected in common in a wired OR arrangement for enabling the interleaving of memory request addresses. Such interleaving is accomplished by controlling the states of the signals applied to the output control (OC) input terminals and the gate or clocking (G) input terminals of the registers 207-82 through 207-88. The output control (OC) terminals enable so-called tristate operation. That is, when either signal Q2TRST000 or signal Q1TRST010 is in a binary ONE state, this inhibits any memory request address signals from being applied to the Q output terminals of that register.

Read/Write Control Section 208

Figure 4:
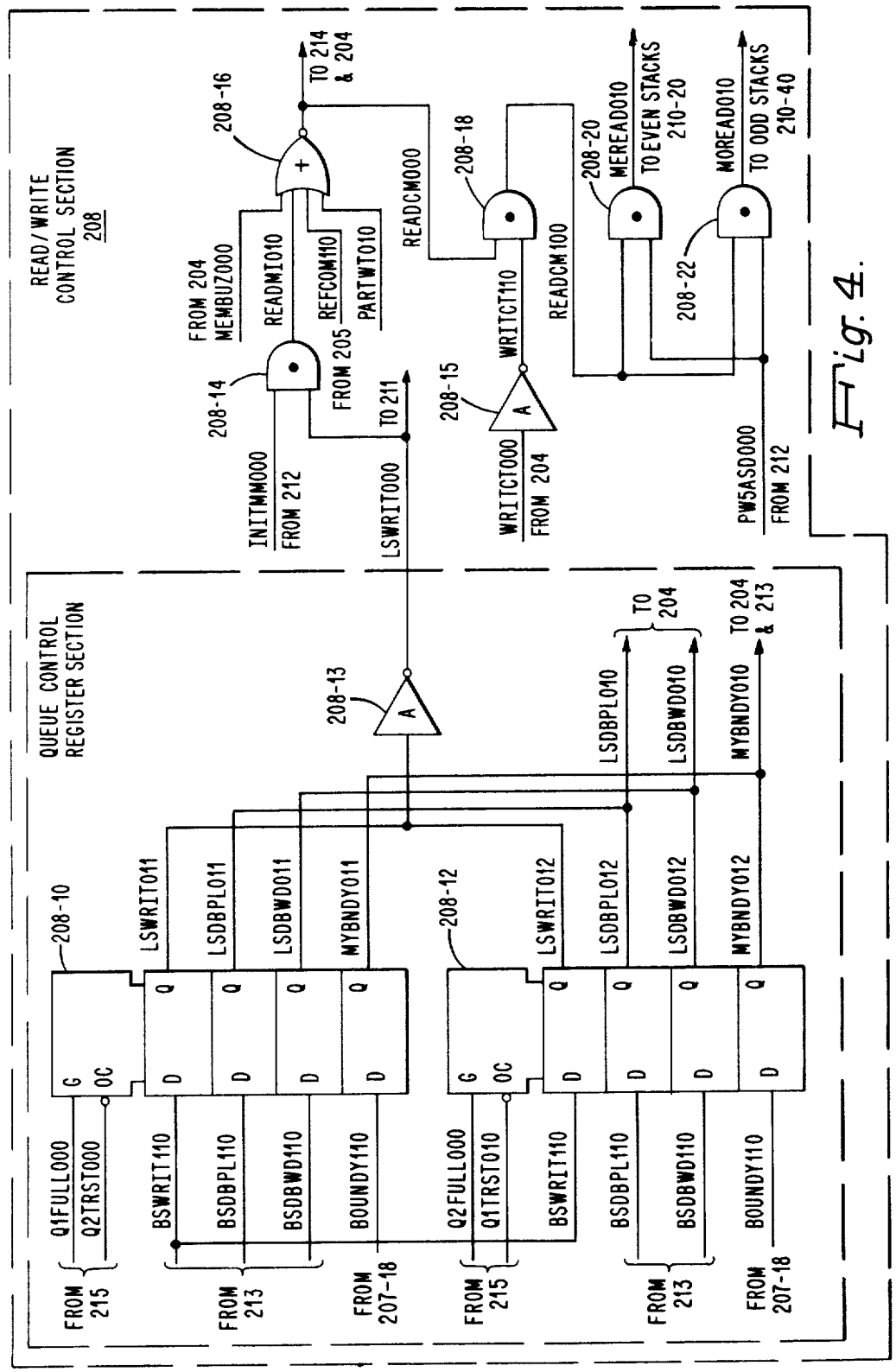

A portion of the circuits of section 208 is shown in greater detail in FIG. 4. As shown, the section 208 includes a pair of registers 208-10 and 208-12 in addition circuits 208-12 through 208-22. Each of the registers 208-10 and 208-12 is constructed from D-type transparent latch circuits designated as SN74S373 and store signals BSWRIT110, BSDBPL110, BSDBWD110 and BOUNDY110. The signal BSWRIT110 is representative of a read/write command while signals BSDBPL110 and BSDBWB110 define different modes of operation for controller 200 (e.g. burst mode, double wide mode, double pull mode). These signals are latched in registers 208-10 and 208-12 when signal Q1FULL000 or Q2FULL000 from section 215 switches to a binary ONE. As seen from FIG. 4, the output terminals of registers 208-10 and 208-12 are connected in common in a wired OR arrangement, enabling the multiplexing or interleaving of memory commands. The signals Q1TRST010 and Q2TRST000 enable the tristate operation of registers 208-10 and 208-12 as discussed relative to section 207-80.

The write mode signal LSWRIT010 is applied to section 211. A read mode signal LSWRIT000 is generated by an inverter circuit 208-13 and applied to an AND gate 208-14 which also receives an initialize signal INITMM000 from section 212.

The AND gate 208-14 in response to a read command (i.e., signal LSWRIT000 is a binary ONE) when the system is not being initialized forces signal READ-MI010 to a binary ONE. When signal READMI010 is a binary ONE, this causes a NOR gate 208-16 to force a read command signal READCM000 to a binary ZERO. An AND gate 208-18 in response to signal READCM000 forces signal READCM100 to a binary ZERO. A pair of AND gates 208-20 and 208-22 force signals MEREAD010 and MOREAD010 to binary ZEROS. These signals are applied to the read/write control lines of the even and odd stack units 210-20 and 210-40. However, the signals are inverted by circuits included with units 210-20 and 210-40 before being applied to the chips which comprise such units.

Another one of the input signals to NOR gate 208-16 is partial write signal PARTWT010. As discussed in U.S. Pat. No. 4,185,323, there are certain types of memory operations such as byte write and initialize operations which require two cycles of operation. As mentioned, in the case of an initialize operation, signal INITMM000 is forced to a binary ZERO. This is effective to override the command applied to the bus. The read/write command signals MEREAD010 and MOREAD010 applied to the stack units 210-20 and 210-40 are generated as a function of signal PARTWT010. Signal PARTWT010 when forced to a binary ONE remains a binary ONE until the end of the first cycle and initiates a second cycle operation during which another set of timing signals identical to the first are generated by the circuits of section 204. During the first cycle, the read/write command signals are forced to binary ZEROS and during the second cycle, the signals are forced to binary ONES.

The other signals MEMBUZ000 and REFCOM110 applied to NOR gate 208-16 are forced to binary ONES prior to the start of a memory cycle of operation and during a refresh cycle respectively. It will be noted from FIG. 4 that during a write cycle of operation when signal WRITCT000 is forced to a binary ZERO by the circuits of section 204, signal WRITCT110 generated by an inverter circuit 208-15 causes AND gate 208-18 to switch signal READCM100 to a binary ONE. This in turn causes AND gates 208-20 and 208-22 to force signals MEREAD010 and MOREAD010 to binary ONES indicating that the stack units 210-20 and 210-40 are to perform a write cycle of operation. At this time, a power on signal PW5ASD000 from section 212 is normally a binary ONE.

Queue Control Section 215

As seen from FIG. 5, section 215 includes the number of queue logic circuits of block 215-1 and the number of burst mode logic circuits of block 215-6. The circuits of block 215-1 include a Q1 full flip-flop 215-10 having an input NAND gate 215-12 and an output inverter circuit 215-14, an arbitrator flip-flop 215-18 having an inverter circuit 215-20, a NAND gate 215-22 and an AND gate 215-24 and a Q2 full flip-flop 215-26 having input NAND gate 215-28 and AND gate 215-30.

Additionally, section 215-1 includes a Q1, Q2 tristate control flip-flop 215-32 having a plurality of input NAND gates 215-34, 215-36 and 215-38 and an exclusive OR gate 215-40, a Q1 cycle flip-flop 215-45 having an input NAND gate 215-42 and a Q2 cycle flip-flop 215-44 having an input NAND gate 215-46 and an inverter circuit 215-43. Both the Q1 and Q2 cycle flip-flops 215-45 and 215-44 connect to an output AND gate 215-50. All flip-flops are constructed from D-type flip-flops such as those designated 74S74 manufactured by Texas Instruments Corporation.

The output signals generated by the Q1 full flip-flop 215-10 and Q2 full flip-flop 215-26 are used to clock address and data signals into different ones of the queue registers of sections 206, 207-7 and 208. The Q1 full and Q2 full flip-flops 215-10 and 215-26 are set to a binary ONE state when controller 200 accepts a memory request indicated by signal MYACKR010 being forced to a binary ONE. This occurs as a function of the state of arbitrator flip-flop 215-18. When the controller control logic circuits of section 215-1 are initialized, arbitrator flip-flop 215-18 is switched to a binary ONE via signal BSMCLR200. Signals Q1FULL000 and Q2FULL000 are forced to binary ONES in response to signal QRREST000 which is generated by signals BSMCLR200 and INITMM100. The first MYACKR100 signal switches the Q1 full flip-flop 215-10 from a binary ZERO to a binary ONE. From this point on, the Q1 full and Q2 full flip-flops 215-10 and 215-26 are enabled for alternate switching by signals ARBTQ1010 and ARBTQ2000 generated by arbitrator flip-flop 215-18. The Q1 and Q2 full flip-flops 215-10 and 215-26 switch on during the leading edge of signal MYACKR010 and switch state again upon the trailing edge of cycle signals Q1CYCL000 and Q2CYCL000. The arbitrator flip-flop 215-18 switches its state on the trailing edge of signal MYACKR010.

The above switching of Q1 and Q2 full flip-flops 215-10 and 215-26 assumes that the signals Q1BURS010 and Q2BURS010 applied to the D input terminals are binary ZEROS. Whenever signal Q1BURS010 or Q2BURS010 is a binary ONE indicating that the queue is processing a burst request, the queue flip-flop associated therewith is inhibited from resetting.

The state of Q1, Q2 tristate control flip-flop 215-32 indicates which queue is active (i.e., controls the outputs of the queue registers of sections 206, 207-7 and 208). It is initially set to a binary ONE state when signal QRREST000 is switched to a binary ZERO upon a change in state in signal Q1Q2CY000. This occurs when both cycle flip-flops 215-40 and 215-44 are switched to binary ZEROS via bus clear signal BSMCLR200. Thereafter, Q1, Q2 tristate control flip-flop 215-32 switches state as an exclusive OR logic function of signals Q2INVT010 and Q2TRST000 at the end of a Q1 or Q2 cycle defined by signal Q1Q2CY000. Signal Q2INVT010 when switched to a binary ONE causes flip-flop 215-32 to remain in a binary ONE only when signal Q2TRST000 is a binary ZERO. However, if signal Q2TRST000 is a binary ONE, flip-flop 215-32 remains in a binary ZERO state. Signal Q2INVT010 is forced to a binary ONE state whenever one of the queues is operating in a burst mode while the other queue is empty.

The states of the Q1 and Q2 cycle flip-flops 215-45 and 215-44 indicates when a particular queue is active (i.e., performing a memory cycle of operation). The setting of these flip-flops occurs as a result of two functions. One is the state or activity of the Q1 and Q2 full signals and the states of the Q1, Q2 tristate signals. When signal Q1TRST010 is a binary ONE indicating that queue 1 is active, signal MPULSE010, generated at the start of the delay line timing circuits 204, switches the Q1 cycle flip-flop 215-40 to a binary ONE at the leading edge of memory busy signal MEMBUZ000. The Q1 cycle flip-flop 215-45 is reset to a binary ZERO at the trailing edge of signal MEMBUZ000. As explained herein, the memory busy signal MEMBUZ000 is generated as a function of the input signals to the delay line circuits 204 and the bus signals, in particular, signal MYDCNN000. Accordingly, once a queue memory cycle of operation is started, it is terminated by a fixed timing pulse in the case of a memory write cycle or it is terminated at the trailing edge of the signal MYDCNN000 in the case of a memory read cycle.

If neither queue is operating in a burst mode, NAND gate 215-38 forces signal Q2INVT010 to a binary ZERO. Signal Q2INVT010 when a binary ZERO causes Q1, Q2 tristate control flip-flop 215-32 to alternate states at the end of an active cycle.

The Q2 cycle flip-flop 215-44 is set and reset in a similar fashion. The positive going edge of signal Q1CYCL000 or signal Q2CYCL000 indicates the end of a queue 1 cycle or Q2 cycle respectively. These signals are used to reset the Q1 full and Q2 full flip-flops 215-10 and 215-26, to condition the delay line restart circuits 204 causing the delay line timing circuits to start another cycle of operation, and to update the state of Q1, Q2 tristate control flip-flop 215-32 via signal Q1Q2CY000. As seen from FIG. 5, signal CYCINH000 inhibits the switching of the Q1 and Q2 cycle flip-flops 215-45 and 215-44 during refresh commands (i.e., when signal REFCOM110 is a binary ONE).

Section 215-6 receives Q1 and Q2 cycle signals Q1CYCL010 and Q2CYCL010 in addition to signals Q1FULL010 and Q2FULL010. As shown, section 215-6 includes a Q1 burst mode flip-flop 215-60 and a Q2 burst mode flip-flop 215-62.

The Q1 burst mode flip-flop 215-60 includes a plurality of input AND gates 215-61 through 215-64, a plurality of inverter circuits 215-65 through 215-68 and NOR gates 215-69 and 215-79. These circuits are connected to force burst mode signal BURSCM110 to a binary ONE upon detection of receipt of a burst command from the bus (i.e., signal BSDBPL100 is a binary ZERO and signal BSDBWD110 is a binary ONE) when the memory command specifies a read operation (i.e., signal BSWRIT200 is a binary ONE) and includes an even or double word address (i.e., signal BSAD22200 is a binary ONE). This switches flip-flop 215-60 to a binary ONE when Q1 becomes full (i.e., Q1 full signal Q1FULL010 switches from a binary ZERO to a binary ONE). When any one of the signals BSMCLR310, BMOLQ1010 or NAKRQ21010 is forced to a binary ONE, NOR gate 215-69 resets Q1 burst mode flip-flop 215-60 to a binary ZERO by forcing signal RESQ1B000 to a binary ZERO. Signal NAKRQ1010 is forced to a binary ONE by AND gate 215-64 in response to a negative acknowledgement (i.e., signal BSNAKR010 is a binary ONE) during a Q1 cycle (i.e., signal Q1CYCL010 is a binary ONE) upon the occurrence of bus signal MYDCNN210 from section 211. Signal BMOLQ1010 is forced to a binary ONE upon receipt of a counter carry out signal BMOLQ1000 from section 207-70.

The Q2 burst mode flip-flop 215-62 receives burst mode signal BURSCM110 from AND gate 215-63 and a reset signal RESQ2B000 generated by an input NOR gate 215-79, an AND gate 215-74 and an inverter circuit 215-78. As seen from FIG. 5, the Q2 burst mode flip-flop 215-62 is switched to a binary ONE in response to signal BURSCM110 when Q2 full signal Q2FULL010 switches from a binary ZERO to a binary ONE. It is reset to a binary ZERO when NOR gate 215-79 switches signal RESQ2B000 to a binary ZERO. This occurs in response to a carry out signal BMOLQ2000 from section 207-70, a negative acknowledgement signal NAKRQ2010 or a bus clear signal BSMCLR310.

The binary ONE outputs from the Q1 and Q2 burst mode flip-flops 215-60 and 215-62 in addition to being applied to section 215-1 are applied to output AND gates 215-80 and 215-82. The AND gate 215-80 generates Q1 up counter signal UPCNQ1000 during a burst mode operation (i.e., signal Q1BURS010 is a binary ONE) of a Q1 cycle (i.e., signal Q1CYCL010 is a binary ONE) in response to bus signal MYDCNN210. In a similar fashion, AND gate 215-82 generates Q2 up counter signal UPCNQ2000. These signals are applied to a corresponding one of the queue counters of section 207-70. The signals are also applied to an OR gate 215-84 for generation of a double wide response signal DWRESP110 which is applied to the line BSDBPL via a driver circuit of section 213. Signal DWRESP110 is forced to a binary ONE when the controller 200 is in a burst mode operation during a queue cycle of operation upon the generation of bus response signal MYDCNN210 by the circuits of section 213. This signal indicates whether or not additional responses (i.e., additional data transfers) are to follow when the controller 200 is operating in a burst mode.

Bus Control Section 211

Figure 6:
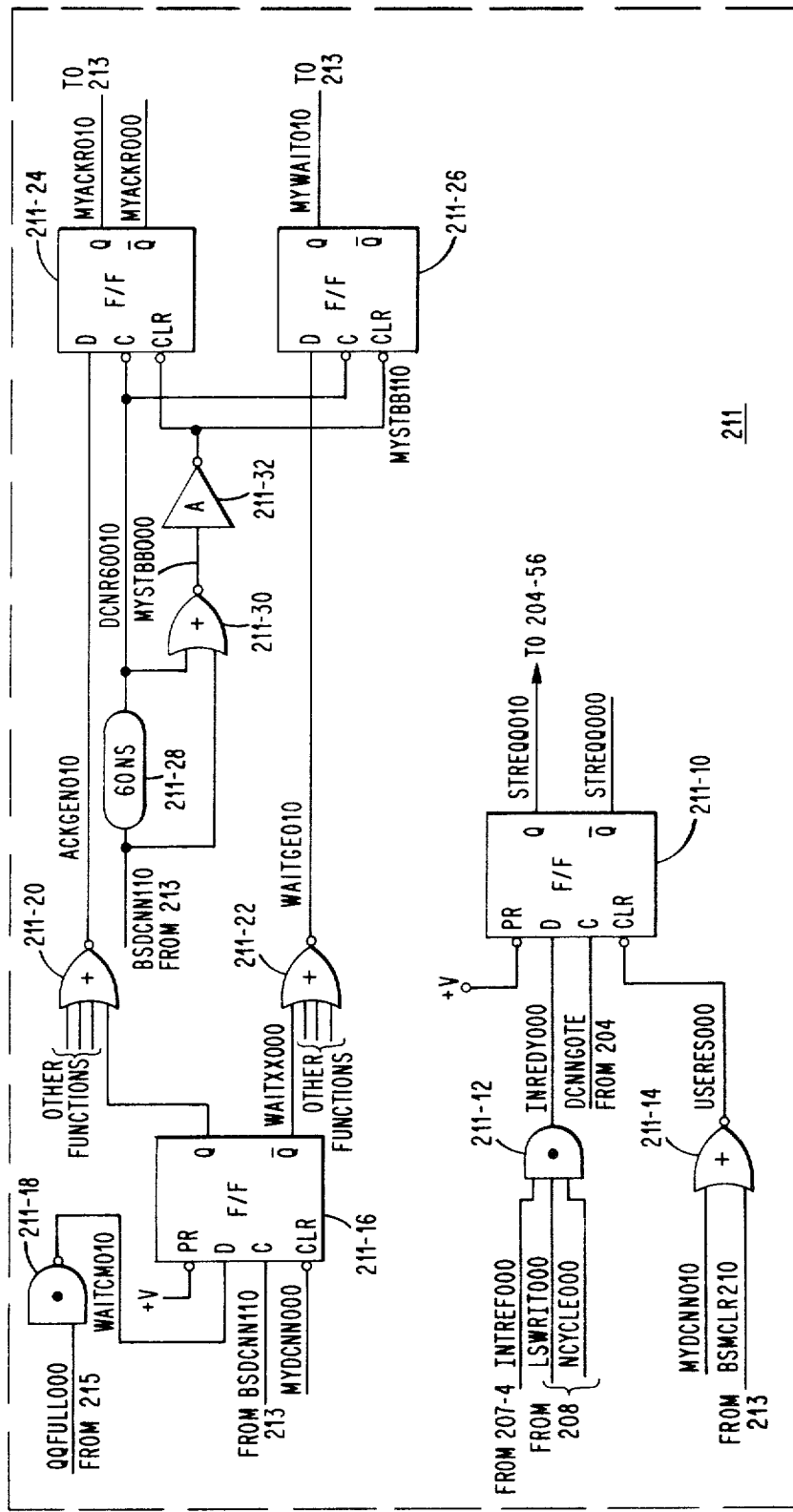

A portion of the circuits of section 211 is shown in FIG. 6. These circuits generate the memory acknowledgement and memory wait response signals MYACKR010 and MYWAIT010 which are applied to the bus via section 213.

Before describing these circuits, a brief explanation of the operation of the bus circuits of section 211 will be given. These circuits are described in detail in the previously referenced patent of John L. Curley, et al. The section 211, as other units which connect to bus 10, include a user flip-flop (not shown) which connects to a request flip-flop (not shown). The circuits shown in FIG. 6 provide an output to user flip-flop, in addition to the bus line BSDBPL via the circuits of block 213.

When a timing signal from the timing generator circuits of section 204 switches from a binary ZERO to a binary ONE, the user flip-flop is switched to a binary ONE when the memory accepts a request and is not performing a refresh cycle. The stored request signal is applied to the input of a request flip-flop, not shown. When this flip-flop is switched to a binary ONE, its output is applied to the bus tie breaking network in addition to the bus driver/receiver circuits of block 213 whereupon it is inverted and is applied to bus line BSREQT. When line BSREQT is forced to a binary ZERO, it prevents any other stored requests of other units from setting their corresponding request flip-flops. Since the memory subsystem 20 has the highest priority, this results in the switching of a grant flip-flop to a binary ONE. This results in signal MYDCNN010 being switched to a binary ONE. The signal MYDCNN010 is inverted by the driver/receiver circuits of block 213 and is applied to line BSDCNN.

Now referring to FIG. 6, it is seen that the circuits include a storage request flip-flop 211-10 having associated input AND gate 211-12 and NOR gate 211-14 circuits, a wait flip-flop 211-16 having an input NAND gate 211-18 and a pair of output NOR gates 211-20 and 211-22 and a pair of memory response flip-flops 211-24 and 211-26 having input circuits which include a 60 nanosecond delay circuit 211-28, a NOR circuit 211-30 and inverter circuit 211-32. The D-type flip-flops 211-10 and 211-16 are constructed from 74S74 chip circuits while the D-type flip-flops 211-24 and 211-26 are constructed from 74S175 chip circuits.

The store request flip-flop 211-10 switches to a binary ONE in the absence of a refresh cycle and when the controller 200 is not being initialized (i.e., when signal INTREF000 is a binary ONE) in response to a memory read request (i.e., signal LSWRIT000 is a binary ONE). Signal NCYCLE000 can be assumed to be a binary ONE. Switching occurs when timing signal DCNNGOTE from section 204 switches from a binary ZERO to a binary ONE. The flip-flop 211-10 is reset to a binary ZERO via NOR gate 211-14 upon the generation of memory bus response signal MYDCNN010 or bus clear signal BSMCLR210.

The wait flip-flop 211-16 is set to a binary ONE in response to a wait command signal WAITCM010 upon the occurrence of bus signal BSDCNN110. Wait command signal WAITCM010 is generated when both queues are full (i.e., signal QQFULL000 is a binary ZERO ensuring maximum memory performance in accordance with the teachings of the present invention). The generation of bus signal MYDCNN000 resets wait flip-flop 211-16 to a binary ZERO.

The state of wait flip-flop 211-16 along with other functions (not shown) determine the type of response generated by controller 200. In the case of a wait condition, signal WAITXX010 inhibits memory acknowledge response flip-flop 211-24 from switching to a binary ZERO state while signal WAITXX000 switches memory wait response flip-flop 211-26 to a binary ONE state. Switching occurs 60 nanoseconds following the generation of bus response signal BSDCNN110. In the absence of a wait condition, signals WAITXX010 and WAITXX000 switch flip-flops 211-24 and 211-26 to a binary ONE and to a binary ZERO, respectively.

Both flip-flops are reset to binary ZEROS following the generation of signals BSDCNN110 and DCNR60010 (i.e., when signal MYSTBB110 is a binary ZERO) on the trailing edge of bus response signal BSDCNN110.

DESCRIPTION OF OPERATION

The operation of the apparatus of the present invention in processing a variety of memory requests in addition to its internal operations requiring the automatic generation of memory cycles will now be described with reference to FIGS. 1 through 6 and the timing diagram of FIG. 7.

FIG. 7 illustrates the operation of the memory delay start apparatus of the present invention in processing external and internal requests. Before describing FIG. 7, it is desirable to briefly discuss the operation of the refresh circuits 205 which are disclosed in U.S. Pat. No. 4,185,323 as previously mentioned and U.S. Pat. No. 4,369,510 entitled "Soft Error Rewrite Control System", invented by Robert B. Johnson and Chester M. Nibby, Jr.

The refresh circuits 205 refresh each dynamic MOS memory cell at a minimum rate of 2 milliseconds. In the case of a 64K MOS chip, 256 cycles at 4 milliseconds or 128 cycles at 2 milliseconds are required to refresh all of the cells of the entire chip. Refresh cycles are evenly distributed throughout the 2 millisecond interval. Therefore, a refresh cycle of operation occurs approximately every 16 microseconds, which satisfies each 64K chip refresh requirement. During each such refresh cycle, the controller 200 is placed in an internal read mode of operation, all memory decode signals are overridden and the same row in every 64K MOS chip of each memory unit is refreshed. Briefly, the sequence of operations for the circuits 205 proceeds as follows. The circuits 205 signal the need to perform a refresh cycle of operation when an early refresh request signal REREQA010 is generated at a 16 microsecond interval. A period of 120-150 nanoseconds following the generation of signal REREQA010, a refresh request signal REREQB010 is generated in response to a fine refresh signal FINREF010. The signal REREQB010 is used to prevent a conflict with an asynchronously arriving bus cycle request which occurs at the same time the early refresh request is generated.

When the memory busy signal MEMBUZ010 (i.e., MEMCYCL010) is a binary ZERO indicating the controller 200 is not executing a memory cycle, the circuits 205 are able to generate a refresh command (i.e., switch signal REFCOM010 to a binary ONE). The memory busy signal MEMBUZ010 is delayed by a predetermined amount so as to ensure that the queue request path has the fastest response time. Since a memory request for a cycle stored in the "queue" essentially denotes a memory bound system making memory performance critical, the timing paths are designed to ideally recycle memory from the "queue".

The memory delay start circuits of FIG. 3 ensure that memory cycles are reliably initiated automatically within a minimum of time. The arrangement of the invention by minimizing the length of time the memory takes to determine the next action to be taken reduces cycle time thereby increasing cycle repetition rate and memory performance. This requires resolution of conditions which could cause improper initiation of memory cycles or false starts. A predetermined amount of delay corresponding to 30 nanoseconds is selected for delaying memory busy signal MEMBUZ000 to ensure reliable operation under all conditions.

The 30 nanosecond delay interval represents the amount of delay required for resolving two major conditions which if present could result in unreliable operation. The first condition corresponds to the amount of time required for switching the state of queue cycle signal QCYCLE010 to a binary ONE following the switching of memory busy signal MEMBUZ000 to a binary ONE. This sequence can be represented as follows:

MEMBUZ000 ≦ CYCLE FLIP-FLOP ≦ QFULLFLIP-FLOP ≦ QQRECY010 ≦ QCYCLE010 = 28 nanoseconds.

As indicated, the sequence involves the switching of one of the cycle flip-flops 215-44 and 215-45 of FIG. 5 followed by the switching of a corresponding one of the queue full flip-flops 215-10 and 215-26 followed by signal QQRECY010.

The second condition corresponds to the amount of time for switching the state of signal REREQQ000 after memory busy signal MEMBUZ000 switches to a binary ONE. This sequence can be represented as follows:

MEMBUZ000→REFRESH RESET→ REREQA→REREQQ000 = >28 nanoseconds.

As indicated, this sequence involves the resetting of the refresh circuits 205 followed by the switching of signal REREQA000 to a binary ONE state which in turn enables signal REREQQ000 to switch to a binary ONE state.

The other conditions that could give rise to unreliable operation require shorter time intervals for resolution and hence will be automatically taken into account.

As shown in FIG. 7, the generation of signal BSDCNN110 from bus 10 causes the circuits 211 to switch signal MYACKR010 to a binary ONE. This causes OR gate 204-41 of FIG. 3 to force signal QCYCLE010 to a binary ONE. Also, signal MYACKR010 switches Q1 full flip-flop 215-10 to a binary ONE indicating that the queue 1 circuits are to carry out a memory cycle of operation.

The Q1 full signal Q1FULL010 loads signals representative of memory address bits 19-21 of the first memory request into Q1 counter 207-72 of FIG. 2. The remaining address bits 22 and 5-18 are loaded into queue 1 address registers 207-82 and 207-84 of FIG. 2 together with the state of signal BSADX6010. Additionally, Q1 full signal Q1FULL010 loads the states of control lines BSWRIT, BSDBPL and BSDBWD corresponding to signals BSWRIT110, BSDBPL110 and BSDBWD110 into the Q1 command control register 208-10 of FIG. 4. At this time, the state of boundary address signal BOUNDY110 from section 207 also is loaded into register 208-10. It will be assumed that signal BSWRIT110 is a binary ZERO and signals BSDBPL110 and BSDBWD110 are binary ONES indicating that controller 200 is to process a read double wide memory request.

The signal MYACKR010 upon being generated resets signal BSDCNN110 to a binary ZERO as shown in FIG. 7. It is also seen that fine refresh signal generated along with early refresh signal REREQA000 switches signal REREQB010 to a binary ONE, 150 nanoseconds later.

As seen from FIG. 3, early refresh signal REREQA000 when forced to a binary ZERO forces signal REREQQ000 to a binary ZERO. Since the refresh command (refresh request) is generated prior to the receipt of the memory request from bus 10, (i.e., signal REREQA000 switches to a binary ZERO before MYACKR010 switches), signal DLYSTR010 generated in response to signal MYACKR010 switches recycle flip-flop 204-38 to a binary ZERO. This in turn forces signal RECYCL010 to a binary ZERO which inhibits the initiation of a memory cycle in response to the bus request indicated by signal MYACKR010.

Since signal MEMBUZ000 is a binary ONE, signal REREQB010 switches refresh command signal REFCOM010 to a binary ONE. Signal REFCOM010 causes the delay line timing circuits of block 204 to generate a sequence of timing signals initiating a memory cycle of operation. As seen from FIG. 3, timing signals DLY180010, DLY260010 and DLYINN010 cause NOR gate 204-52 to force signal MEMCYC000 to a binary ZERO. This results in NOR gate 204-56 forcing signal MEMBUZ000 to a binary ZERO indicating that controller 200 is busy. However, signal REFCOM110 inhibits AND gate 204-46 of FIG. 5 from switching Q1 cycle flip-flop 215-45 to a binary ONE in response to timing signal MPULSE010.

The signal REFCOM000 when a binary ZERO causes NAND gate 207-49 of FIG. 2 to force tristate control signal MREFCT000 to a binary ZERO. This causes refresh address contents of a refresh address register from refresh counter circuits of section 207-6 to be applied to the address terminals of the enabled rows of RAM chips.

The signal REFCOM100 when a binary ZERO forces eight decode signals to binary ONES enabling eight memory locations to be refreshed during the memory cycle of operation.

At the end of the refresh cycle, the circuits 205 switch the refresh command signal to a binary ZERO. Also, refresh signals REREQA000 and REREQB010 are switched to a binary ONE and a binary ZERO respectively. As seen from FIG. 3, the trailing edges of delay line timing signals DLY180010 and DLY260010 switch signal MEMBUZ000 to a binary ONE. Within a minimum of time, the positive going transition of signal MEMBUZ3000 causes AND gate 204-44 to generate start signal DLYSTR010 initiating another memory cycle since there is a request pending in one of the queues (Q1 full flip-flop was set to a binary ONE which forced signal QCYCLE010 to a binary ONE).

As seen from FIG. 7, signal DLYSTR010 when forced to a binary ONE switches recycle flip-flop 204-38 to a binary ONE (i.e., signal REREQQ000 is a binary ONE). This switches signal RECYCL010 to a binary ONE enabling the AND gate of FIG. 3.

Accordingly, signals DLYSTR210 and RECYCL010 cause another sequence of timing signals to be generated initiating a second memory cycle of operation. As seen from FIG. 3, timing signal DLYINN010 forces memory busy signal MEMBUZ000 from a binary ONE to a binary ZERO. From FIG. 7, it is seen that signal MEMBUZ000 remains a binary ZERO only for a period of 80 nanoseconds. In the prior system, this period was approximately double (i.e., 150 nanoseconds). Reducing the length of time signal MEMBUZ000 is at a binary ZERO increases memory cycle repetition rate which increases memory performance.

Also, in accordance with the teachings of the invention, the delay line timing generator circuits may be retimed to generate its sequence of timing signals 20 nanoseconds or more earlier. This reduces the length of memory cycle (i.e., time signal MEMBUZ000 is a binary ZERO). However, in order to ensure sufficient time for addressing during a refresh cycle of operation, a fixed delay is inserted in series with the refresh circuit path. During the second memory cycle, signal MPULSE010, generated by AND gate 204-36, causes NAND gate 215-42 of FIG. 5 to switch Q1 cycle flip-floop 215-45 to a binary ONE in accordance with the state of signal Q1TRST010. That is, Q1,Q2 tristate control flip-flop 215-32 of FIG. 5 is a binary ONE at this time (i.e., initially forced to a binary ONE by reset signal QRREST000).

The queue address signals applied to the output terminals of Q1 address registers 207-82 and 207-84 of FIG. 2 in response to signal Q2TRST000 are transferred into row and column address registers 207-40 and 207-41. Also, signals BSAD20210 and BSAD19210 from Q1 counter 207-76 are loaded into register 207-40.

The address signals BSAD21210 and BSAD22210 from sections 207-70 and 207-80 are decoded which forces a pair of RAS decode signals to binary ONES. The timing signals MRASTE010 and MRASTO010 generated by the circuits of section 204 are applied to the rows of RAM chips of the memory. These signals cause the row address signals MADD00010-MADD07010 applied by register 207-41 of FIG. 2 in response to signal MRASCT000 to the address terminals of the rows of RAM chips to be stored in the pair of rows selected by the pair of RAS decode signals. Assuming that least significant address bit BSAD21 also has a value of ZERO, the low order 4 row address bits pass through adder circuit 207-54 unincremented.

The timing signals MCASTT010 and MCASTS010 generated by the circuits of section 204 store the column address signals MADD00010-MADD07010 applied by register 207-42 in response to signal MCASTT000 to the terminals of all of the rows of RAM chips within stacks 210-20 and 210-40 of FIG. 1.

The memory request stored within the queue 1 circuits of queue sections 207-7 and 208 cause the contents of a first pair of storage locations to be read out from the specified addresses. The pair of words are loaded into the middle right sections of data registers 206-8 and 206-10 in response to timing signals MDOECT010 and MDOOCT010 generated by section 204.

From there, the pair of words are applied to lines MUXD00-15 and MUXD16-31 of FIG. 3 via the data out multiplexer circuits 206-16 and 206-18 as a function of the state of address bit BSAD22. That is, when signal BSAD22210 is a binary ZERO, the contents of the even data register is applied to lines MUXD00-15 by multiplexer circuit 206-16. The multiplexer circuit 206-18 applies the odd data register contents to lines MUXD16-31. The reverse of this occurs when address bit BSAD22 is a binary ONE.

The transfer of the data occurs during the second half of the bus cycle designated by the "1" portion of signal BSDCNN110 in FIG. 7. This signal is switched to a binary ONE on the leading edge of signal MYDCNN010. This, in turn, forces line BSDCNN to a binary ONE state signalling the requestor of a bus data cycle.

Since burst mode flip-flop 215-60 is a binary ZERO, AND gate 215-80 of FIG. 7 holds signal UPCNQ1000 at a binary ZERO. This causes double wide response signal DWRESP110 to remain a binary ZERO. This response signal when applied to the circuits of block 213 forces line BSDBPL to a binary ZERO to signal the memory requestor that no more transfers of word pairs are to take place.

The queue 1 memory cycle of operation is completed when the trailing edge of signal BSDCNN110 switches memory busy signal MEMBUZ000 to a binary ONE. Signal MEMBUZ000 causes Q1 cycle flip-flop 215-45 to switch to a binary ZERO state. This, in turn, causes Q1 full flip-flop 215-10 to switch to a binary ZERO state. This causes NAND gate 204-40 of FIG. 3 to again force signal QQRECY010 to a binary ZERO.

From the foregoing, it is seen how the queue control circuits 215 and restart timing circuits of block 204 initiate within a minimum of time successive cycles of operation for processing an internal refresh command request and a pending memory queue request. Also, in accordance with the teachings of the present invention, the queue control circuits and memory start circuits of block 204 provide for resolution of a variety of different conflict situations occurring during the processing of a number of different types of requests.

The invention increases memory performance by minimizing the length of time required to determine the next action the controller is to take. Also, by having the memory controller only hold up its receipt of further requests from the bus (i.e., signal a wait condition) when the "queue" is full enables the system to realize the increases in memory performance provided by the present invention.

While the internal requests involved refresh operation, it will be appreciated that other types of requests requiring allocations of memory cycles can be processed in a similar fashion. For example, in certain cases, controller 200 is required to perform a soft error rewrite cycle of operation such as described in U.S. Pat. No. 4,359,771 entitled "A Method and Apparatus for Testing and Verifying the Operation of Error Control Apparatus Included Within a Memory System", invented by Robert B. Johnson and Chester M. Nibby, Jr. Thus, this type of request would be applied as another input to the AND gate 204-42 and queue control circuits of section 215.

It will be appreciated by those skilled in the art that many other changes may be made to the illustrated embodiment without departing from the teachings of the present invention. That is, different logic circuits which perform equivalent functions may be used without departing from the scope of the present invention. For example, the logic circuits 204-40 and 204-41 may be replaced with a single NAND gate which has the inputs Q1FULL, Q2FULL and MYACKR.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory controller for use in a system including at least one request generating unit coupled to a bus in common with said controller, said controller being coupled to at least one memory module for controlling the operation of said module in response to each of a number of different types of memory requests generated by said unit requiring one or more memory cycles of operation, said module including a plurality of word locations and said controller including control circuits for generating command signals requesting said controller to perform internal operations requiring memory cycles of operation and means for generating control signals when said memory cycles of operation are being performed, said controller further comprising:

at least one queue circuit means, said queue circuit means being coupled in common to said module and to said bus for receiving and storing different ones of said plurality of memory requests;

queue control means coupled to said queue circuit means, said queue control means generating signals for indicating the request availability status of said queue circuit means; and, memory delay start control means being directly coupled to said queue control means and to said control circuits for receiving said command signals, said memory delay start control means including:

delay circuit means coupled to receive said control signals; and, recycle control means coupled to said delay circuit means, to said queue control means and to said control circuits, said recycle means being operative in response to said signals from said control circuits and each of said means to generate signals on a predetermined priority basis for initiating successive memory cycles of operation within a minimum of time for processing both said internal operations and said memory requests.

2. The controller of claim 1 wherein said controller further includes:

timing generator means coupled to said means for generating, to said memory delay start control means, to said queue control means and to said control circuits, said timing generator means being operative in response to said command signals and to said signals from said memory start control means to generate predetermined sequences of timing signals for performing said succeeding memory cycles of operation within said memory module and said means for generating being operative in response to predetermined ones of said predetermined sequences of timing signals to generate said control signals.

3. The controller of claim 1 wherein said delay circuit means includes:

a delay circuit; and logic circuit gating means coupled in series with said delay circuit, said logic circuit gating means being coupled to said bus and operative in response to signals from said bus and said control signals to generate memory busy signals and said delay circuit delaying each of said memory busy signals by a predetermined amount for conditioning said memory delay start control means to enable the reliable initiation of successive cycles of operation within said minimum of time.

4. The controller of claim 3 wherein said predetermined amount corresponds to a delay of 30 nanoseconds.

5. The controller of claim 2 wherein said queue control means includes:

at least one bistable indicator means, said bistable indicator means being coupled to said queue circuit means and to said bus, said bistable indicator means being switched from a first to a second state in response to each of said number of requests being stored in said queue circuit means and wherein said memory delay start control means further includes:

logic gating means coupled to said timing generator means, to said delay circuit means, to said queue control means and to said recycle control means, said logic gating means being operative to generate delay start timing signals by logically combining said control signals and said availability status signals, said recycle control means being conditioned by each of said delay start timing signals to initiate said successive memory cycles of operation within said minimum period of time.

6. The controller of claim 5 wherein said logic gating means includes AND gating means.

7. The controller of claim 6 wherein said AND gating means is operative to generate said delay start timing signal within a minimum period of time after said control signals indicate that said memory cycle of operation is not being performed when said availability status signals indicate that said queue circuit contains a memory request to be processed.

8. The controller of claim 5 wherein said logic gating means further couples to said bus for receiving signals indicative of said memory requests, said logic gating means being operative to generate as an output, said delay start timing signals by logically combining said control signals, and said memory request signals, said recycle control means being conditioned by said delay start timing signals to initiate said successive memory cycles of operation.

9. The controller of claim 5 or 8 wherein said recycle control means of said memory delay start control means includes bistable circuit means coupled to said logic circuit gating means and to said control circuits, said bistable circuit means being operative to switch from a first state to a second state in response to said delay start timing signal in the absence of said command signals being applied from said control circuits indicative of a pending internal operation, for initiating another memory cycle of operation.

10. The controller of claim 9 wherein said control circuits include refresh control circuits operative to periodically generate said refresh command signals requesting said controller to perform refresh cycles of operation upon said plurality of word locations of said memory module and wherein said bistable circuit means includes a flip-flop having a data input terminal, a clock input terminal and an output terminal, said data input terminal being connected to receive said refresh command signals and said clock input terminal being connected to receive said delay start timing signals, said flip-flop being switched from a binary ZERO to a binary ONE state in response to each said delay start timing signal in the absence of said refresh command signals for generating at said output terminal a signal for initiating said another memory cycle of operation.

11. The controller of claim 9 wherein said memory delay start control means further includes:

a delay circuit coupled to said timing generator means and in series with said logic circuit means for receiving each said delay start timing signal, said delay circuit being operative to delay said delay start timing signal by a predetermined amount for ensuring that said timing generator means initiates a memory cycle of operation only after said bistable circuit means has been switched to said second state.

12. The controller of claim 11 wherein said timing generator means includes input AND gating means coupled to said delay circuit and to said bistable circuit means, said AND gating means being operative to generate an output signal for initiating said memory cycle of operation only in response to each said delay start timing signal when said bistable circuit means is in said second state.

13. The controller of claim 11 wherein said predetermined amount corresponds to a delay of 20 nanoseconds.

14. A memory controller for use in a system including at least one request generating unit coupled to a bus in common with said controller, said controller being coupled to a number of memory modules for controlling the operation of said modules in response to a number of different types of memory requests generated by said unit requiring memory cycles of operation, each of said modules including a plurality of word locations and said controller including refresh control circuits for periodically generating refresh command signals requesting said controller to perform refresh operations upon said plurality of word locations of said number of memory modules and means for generating memory busy signals when said memory cycles of operation are being performed, said controller further comprising:

at least a pair of queue circuit means, each being coupled in common to said number of memory modules and to said bus for receiving and storing different ones of said plurality of memory requests;

queue control means coupled to said queue circuit means, said queue control means generating signals for indicating the request availability status of said queue circuit means, said queue control means being coupled to each of said pair of queue circuits; and, memory delay start control means coupled to said queue control means, to said refresh control circuits and to said bus for receiving said refresh command signals, signals from said queue control means indicative of said request availability status and signals from said bus indicating the receipt of one of said requests from said unit, said memory delay start control means including:

delay circuit means coupled to receive each of said memory busy signals indicating when said memory cycle of operation is being performed; and, recycle control means coupled to said refresh control circuits, to said delay circuit means and to said queue control means, said recycle means being operative in response to said each memory busy signal, said refresh command signals, and said availability status signals to generate signals on a predetermined priority basis for producing successive memory cycles of operation within a minimum of time for processing both refresh operations and memory requests received concurrently by said recycle control means with a minimum of conflict.

15. The controller of claim 14 wherein said controller further includes:

timing generator means coupled to said memory delay start control means, to said queue control means and to said refresh control circuits, said timing generator means being operative in response to said refresh commands and to said signals from said memory delay start control means to generate predetermined sequences of timing signals for performing said successive memory cycles of operation within said number of memory modules and said means for generating being operative in response to predetermined one of said predetermined sequences of timing signals to generate said memory busy signals.

16. The controller of claim 14 wherein said delay circuit means includes:

a delay circuit for delaying each of said memory busy signals by a predetermined amount for enabling the reliable initiation of successive cycles of operation within said minimum of time.

17. The controller of claim 15 wherein said queue control means includes:

at least a pair of bistable indicator means, each being coupled to a different one of said queue circuit means and to said bus, each of said bistable indicator means being switched from a first to a second state in response to a request being stored in said queue circuit means associated therewith and wherein said memory delay start control means further includes:

logic gating means coupled to said delay circuit means, to said queue control means, to said bus and to said recycle control means, said logic gating means being operative to generate delay start timing signals by logically combining said memory busy signals from said means for generating, said availability status signals and said memory request signals, said recycle control means being conditioned by said delay start timing signals to initiate said successive memory cycles of operation within said minimum period of time.

18. The controller of claim 17 wherein said logic gating mean includes AND gating means.

19. The controller of claim 18 wherein said AND gating means is operative to generate said delay start timing signals within a minimum period of time after said memory busy signal indicates that said memory cycle of operation is not being performed and said availability status signals indicate that at least one of said pair of queue circuits contains a memory request to be processed.

20. The controller of claim 17 wherein said recycle control means of said memory delay start control means includes bistable circuit means coupled to said logic circuit gating means and to said refresh control circuits, said bistable circuit means being operative to switch from a first state to a second state in response said delay start timing signal in the absence of said refresh command signals being applied from said refresh control circuits indicative of a pending internal operation, for enabling the initiation of another memory cycle of operation.

21. The controller of claim 20 wherein said memory delay start control means further includes:

a delay circuit coupled in series with said logic circuit means to said timing generator means for receiving said delay start signal, said delay circuit being operative to delay said delay start signal by a predetermined amount for ensuring that said timing generator means initiates a memory cycle of operation only when said bistable circuit means has been switched to said second state.

22. A memory controller for use in a system including a plurality of requests generating untis coupled to a bus in common with said controller, said controller being coupled to a pair of memory modules for controlling the operation of said modules in response to a number of different types of memory requests generated by said units, said requests including predetermined types of requests requiring a plurality of memory cycles of operation, each of said modules including a plurality of word locations and said controller including refresh control circuits for periodically generating refresh command signals requesting said controller to perform refresh operations upon said plurality of word locations within each of said modules and means for generating a memory busy signal when each of said plurality of memory cycles of operation is being performed, said controller comprising:

a pair of queue circuits, each queue circuit being coupled in common to said plurality of said modules and to said bus for receiving a different one of said plurality of memory requests;

a queue control circuit coupled to each of said pair of queue circuits and to said refresh control circuits, said queue control means including a pair of bistable indicator means for indicating when one of said pair of queue circuits has a memory request stored requiring a memory cycle of operation; and, a memory delay start control circuit coupled to said queue control circuit, to said refresh control circuits and to said bus for receiving said refresh command signals, signals from said queue control circuit indicative of said request availability status and signals from said bus indicating the receipt of a request from said unit, said memory delay start control circuit including:
- a delay circuit coupled to receive and to delay said memory busy signal indicating when said memory cycle of operation is being performed; and,
- a recycle control circuit coupled to said delay circuit, to said refresh control circuits and to said queue control circuit, said recycle control circuit being operative in response to said signals from each of said circuits and said bus to generate signals on a predetermined priority basis for enabling successive memory cycles of operation to be initiated within a minimum of time for processing both refresh operations and memory requests received concurrently with a minimum of conflict.

23. The controller of claim 22 wherein said controller further includes:
- a timing generator circuit coupled to said memory delay start control circuit, to said queue control circuit and to said refresh control circuits, said timing generator circuit being operative in response to said refresh commands and to said signals from said memory delay start control circuit to generate predetermined sequences of timing signals for performing said successive memory cycles of operation within said plurality of memory modules and said means for generating being operative in response to predetermined ones of said predetermined sequences of signals to generate said memory busy signals.

24. The controller of claim 22 wherein said delay circuit is operative to delay said memory busy signal by a predetermined amount for enabling the reliable initiation of said successive cycles of operation within said minimum of time.

25. The controller of claim 23 wherein said queue control circuit includes:
- at least a pair of bistable indicator circuits, each being coupled to a different one of said queue circuits and to said bus, each of said bistable indicator circuits being switched from a first to a second state in response to a request being stored in said queue circuit associated therewith and wherein said memory delay start control circuit further includes:
- logic gating means coupled to said delay circuit, to said queue control circuit, to said bus and to said recycle control circuit, and logic gating means being operative to generate a delay start timing signal by logically combining said memory busy signal, said availability status signals and said memory request signals, said recycle control circuit being conditioned by said delay start timing signal to initiate said successive memory cycles of operation within said minimum period of time.

26. The controller of claim 25 wherein said logic gating means incudes AND gating means.

27. The controller of claim 26 wherein said AND gating means is operative to generate said delay start timing signal within a minimum period of time after said memory busy signal indicates that said memory cycle of operation is not being performed when said availability status signals indicate that at least one of said pair of queue circuits contains a memory request to be processed.

28. The controller of claim 25 wherein said recycle control circuit of said memory delay start control circuit includes a clocked bistable circuit having a data input terminal, a clock input terminal and an output terminal, said clock input terminal being coupled to said logic circuit gating means and said data input terminal being coupled to said refresh control circuits, said bistable circuit being operative to switch from a first state to a second state in response to said delay start timing signal in the absence of said refresh command signal being applied as a clocking signal by said refresh control circuits indicative of a pending internal operation, said bistable circuit when in said second state enabling said timing generator circuit to initiate another memory cycle of operation.

29. The controller of claim 27 wherein said memory delay start control means further includes:
- a delay circuit coupled to said timing generator means in series with said logic circuit means for receiving said delay start signal, said delay circuit being operative to delay said delay start signal by a predetermined amount for ensuring that said timing generator means intiates a memory cycle of operation only after said bistable circuit has been switched to said second state.

* * * * *